US010762314B2

(12) United States Patent
Suman et al.

(10) Patent No.: US 10,762,314 B2
(45) Date of Patent: Sep. 1, 2020

(54) ANTI-COUNTERFEITING BARCODE READER AND ASSOCIATED METHODS

(71) Applicant: Datalogic IP Tech S.R.L., Calderara di Reno, Bologna (IT)

(72) Inventors: Michele Suman, Ponte San Nicolo (IT); Giulio Berzuini, Calderara di Reno (IT); Maurizio Bianchi, Calderara di Reno (IT)

(73) Assignee: Datalogic IP Tech S.r.l., Calderara Di Reno (IT)

( * ) Notice: Subject to any disclaimer, the term of this patent is extended or adjusted under 35 U.S.C. 154(b) by 0 days.

(21) Appl. No.: 15/592,092

(22) Filed: May 10, 2017

(65) Prior Publication Data
US 2018/0330135 A1  Nov. 15, 2018

(51) Int. Cl.
*G06K 7/10* (2006.01)
*G06K 19/16* (2006.01)
(Continued)

(52) U.S. Cl.
CPC ..... *G06K 7/10732* (2013.01); *G06K 7/10881* (2013.01); *G06K 19/14* (2013.01); *G06K 19/16* (2013.01); *G06K 7/10742* (2013.01); *G06K 7/12* (2013.01); *G06K 19/06046* (2013.01); *G06K 2007/10524* (2013.01)

(58) Field of Classification Search
CPC .............. G06K 7/12; G06K 7/10732; G06K 19/06037; G06K 19/0614; G06K 19/14; G06K 7/10881; G06K 19/16
See application file for complete search history.

(56) References Cited

U.S. PATENT DOCUMENTS

| 5,444,225 A | 8/1995 | Takahashi et al. |
| 5,756,981 A * | 5/1998 | Roustaei ................. G03F 7/705 235/462.07 |

(Continued)

FOREIGN PATENT DOCUMENTS

| DE | 102008053798 A1 | 5/2010 |
| EP | 1959403 A2 | 8/2008 |
| EP | 2354859 A1 | 8/2011 |

OTHER PUBLICATIONS

Meruga, Jeevan, et al., "Security printing of covert quick response codes using upconverting nanoparticle inks," Nanotechnology, vol. 23, No. 39, Sep. 11, 2012.

(Continued)

Primary Examiner — Christopher Stanford
(74) Attorney, Agent, or Firm — Foley & Lardner LLP

(57) ABSTRACT

A code reader may include a light source configured to illuminate a machine-readable indicia representative of a standard code associated with an item. An image sensor may be configured to receive an image of the machine readable indicia. An illumination source may be configured to illuminate an anti-counterfeiting key that, when illuminated by the illumination source, reflects the illumination from the illumination source to be incident on the image sensor. A processing unit may be in electrical communication with the image sensor, and may be configured to decode the standard code of the machine-readable indicia and check validity of the reflected illumination from the anti-counterfeiting key.

24 Claims, 33 Drawing Sheets

(51) Int. Cl.
*G06K 19/14* (2006.01)
*G06K 7/12* (2006.01)
*G06K 19/06* (2006.01)

(56) References Cited

U.S. PATENT DOCUMENTS

| | | | | |
|---|---|---|---|---|
| 6,029,893 | A * | 2/2000 | Tan | G06K 7/10702 235/462.33 |
| 6,354,501 | B1 * | 3/2002 | Outwater | G06K 7/1097 235/462.01 |
| 6,373,965 | B1 * | 4/2002 | Liang | B41M 3/144 382/112 |
| 7,025,269 | B2 | 4/2006 | Marshall | |
| 7,267,280 | B2 * | 9/2007 | Lubow | G06K 7/1434 235/454 |
| 7,309,011 | B2 * | 12/2007 | He | G06K 7/10732 235/385 |
| 7,364,074 | B2 * | 4/2008 | He | G06Q 10/087 235/385 |
| 8,052,058 | B2 * | 11/2011 | He | G06Q 10/06 235/462.09 |
| 8,171,567 | B1 * | 5/2012 | Fraser | G06T 1/0021 726/32 |
| 8,590,795 | B2 | 11/2013 | Vicenzi | |
| 9,298,961 | B2 | 3/2016 | Mazzone et al. | |
| 9,818,249 | B1 * | 11/2017 | Fraser | G06T 1/0021 |
| 10,083,367 | B2 * | 9/2018 | Braumandl | G06K 9/78 |
| 10,248,821 | B2 * | 4/2019 | Russell | G06K 7/10881 |
| 2003/0098350 | A1 | 5/2003 | Liou et al. | |
| 2003/0136837 | A1 * | 7/2003 | Amon | G07D 7/04 235/435 |
| 2006/0095778 | A1 * | 5/2006 | He | G06Q 10/087 713/180 |
| 2007/0081210 | A1 * | 4/2007 | Wilkinson | G03H 1/22 359/18 |
| 2008/0185438 | A1 * | 8/2008 | Pinchen | G06K 7/14 235/462.01 |
| 2016/0078307 | A1 * | 3/2016 | Pawlik | G06K 9/00577 235/375 |
| 2018/0270474 | A1 * | 9/2018 | Liu | A61B 6/508 |

OTHER PUBLICATIONS

Extended European Search Report corresponding to Europe Patent Application No. 18171755.4, dated Oct. 10, 2018, 6 pages.

* cited by examiner

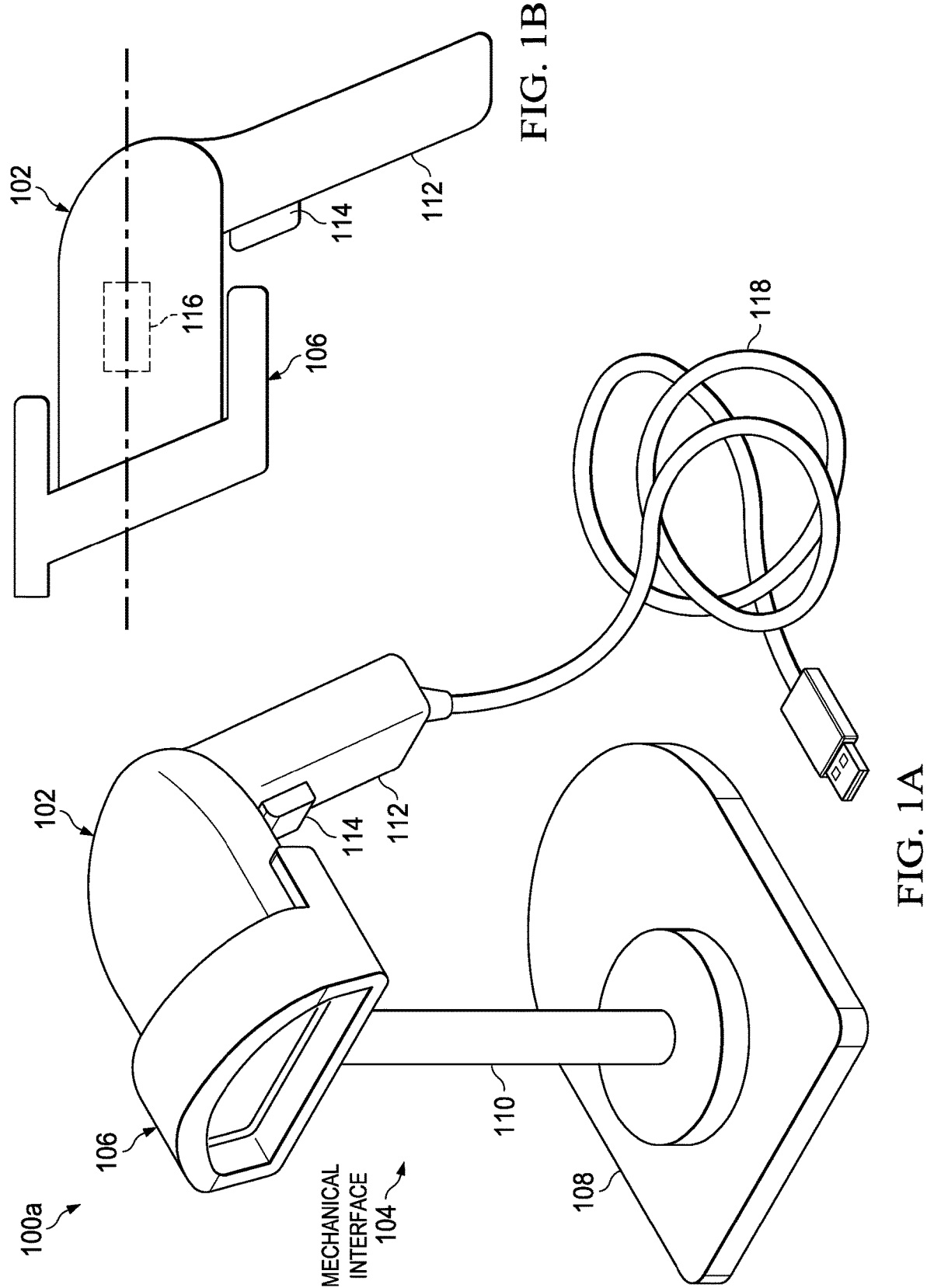

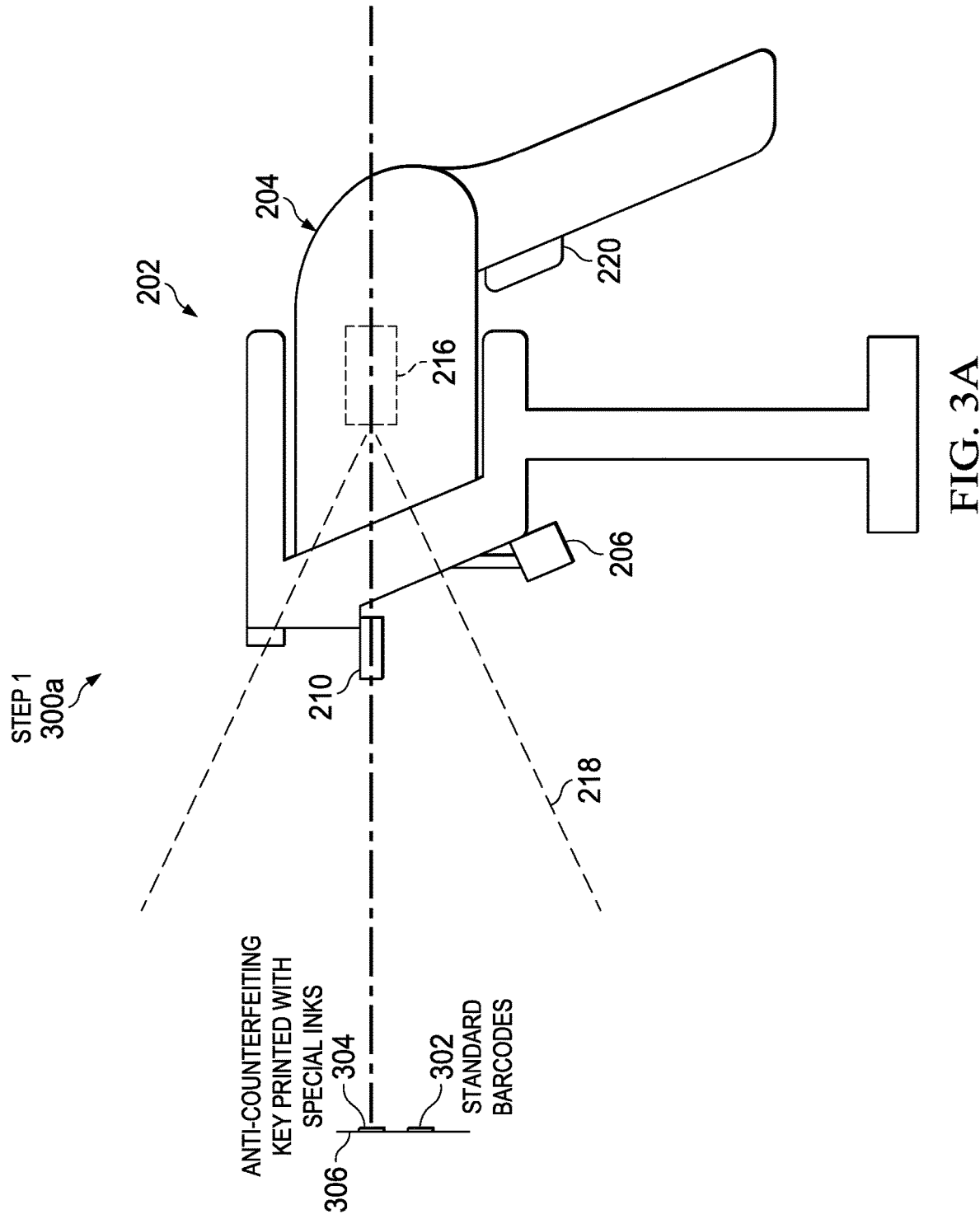

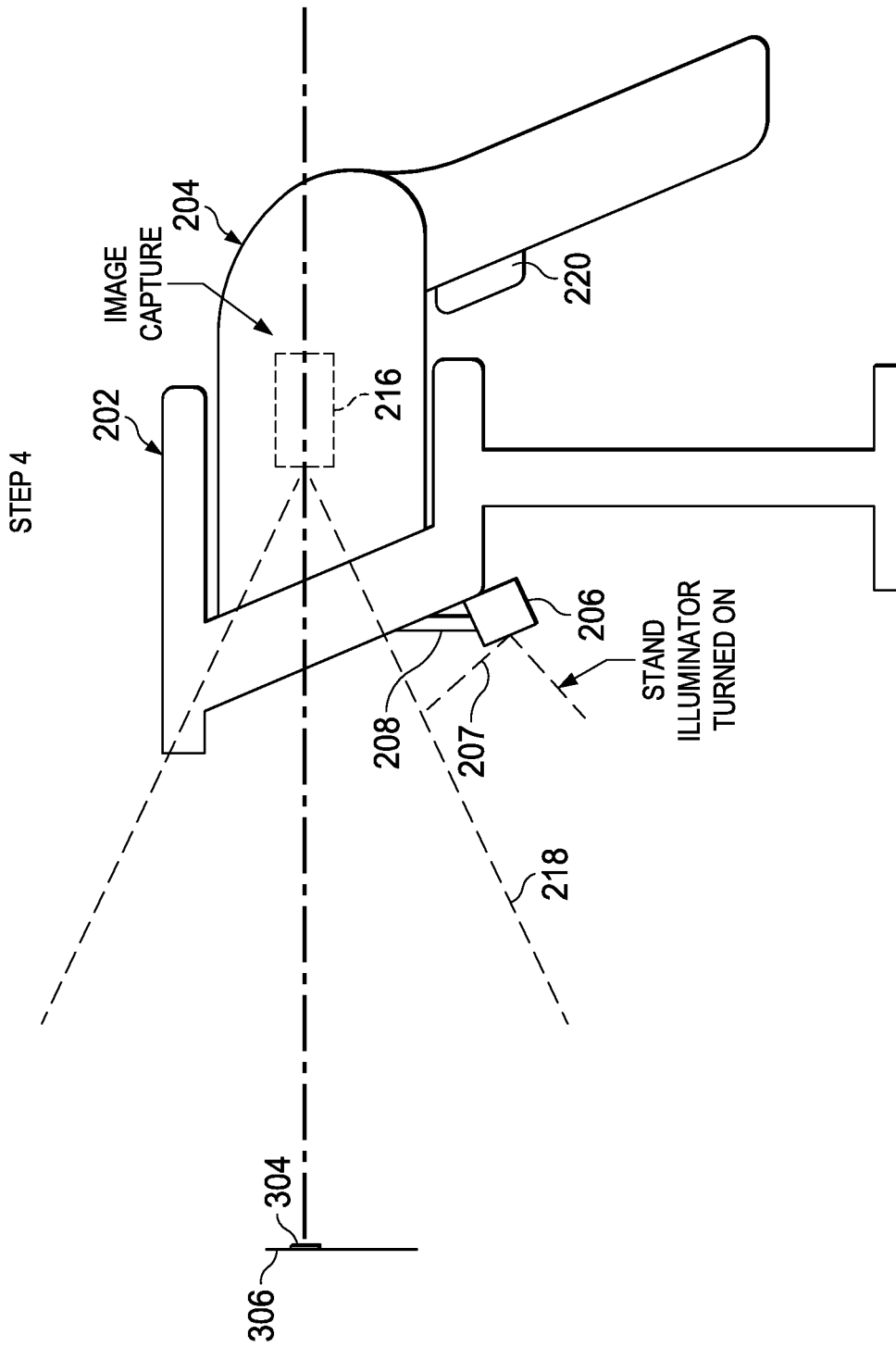

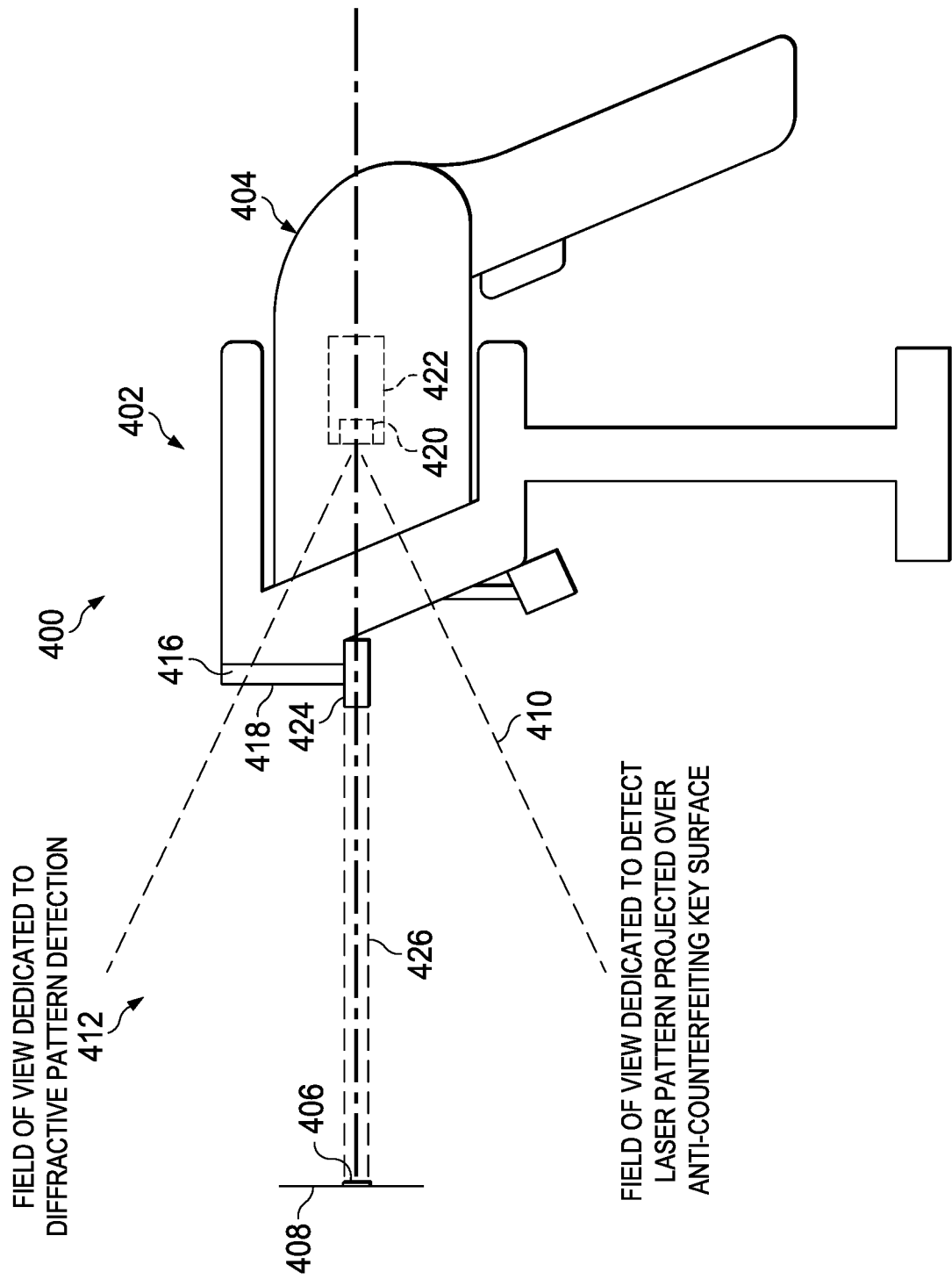

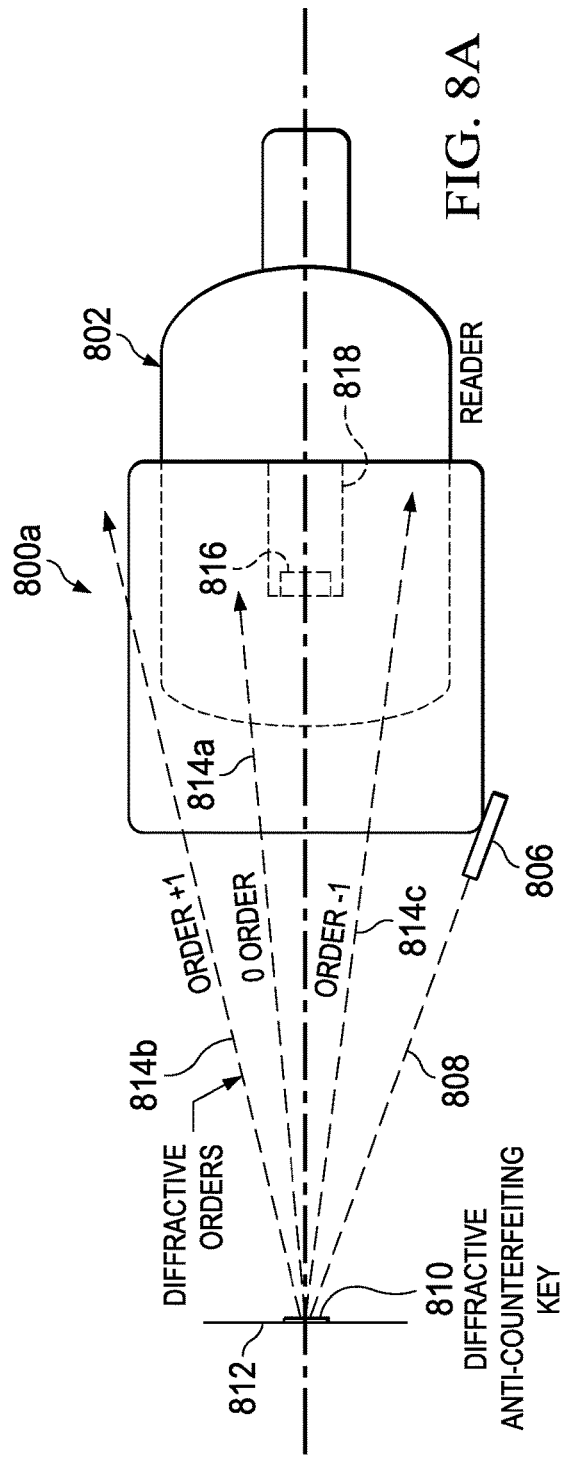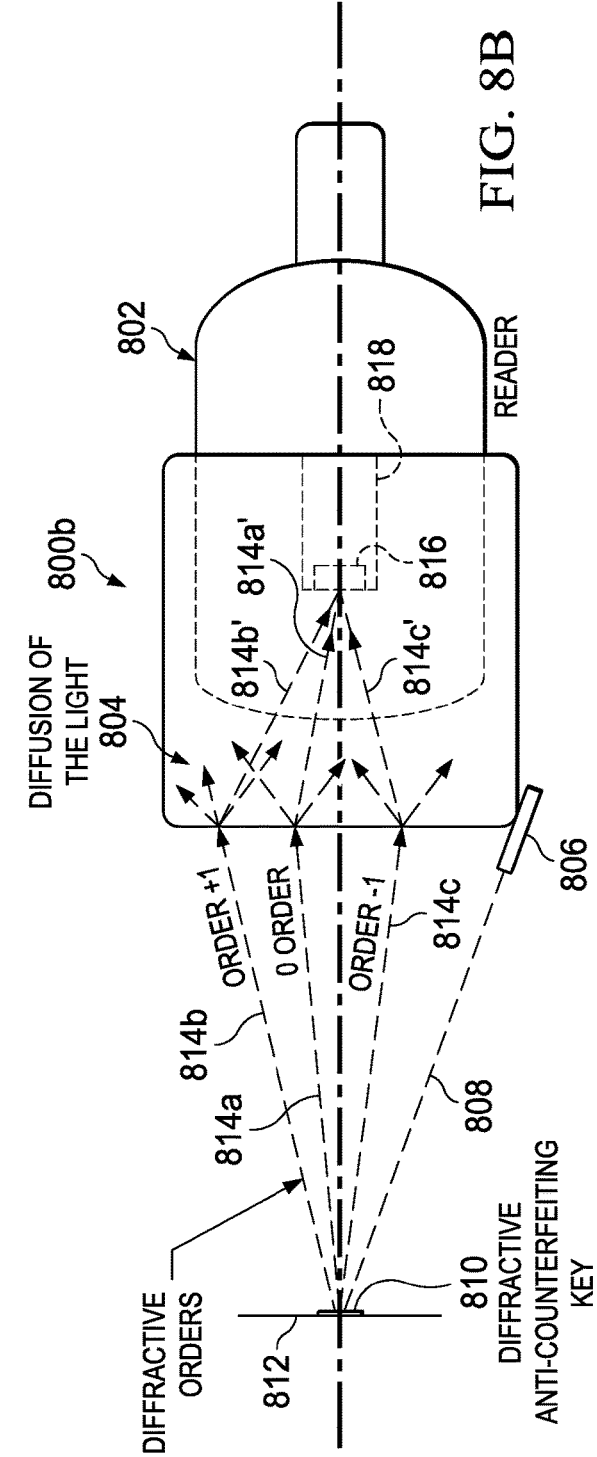

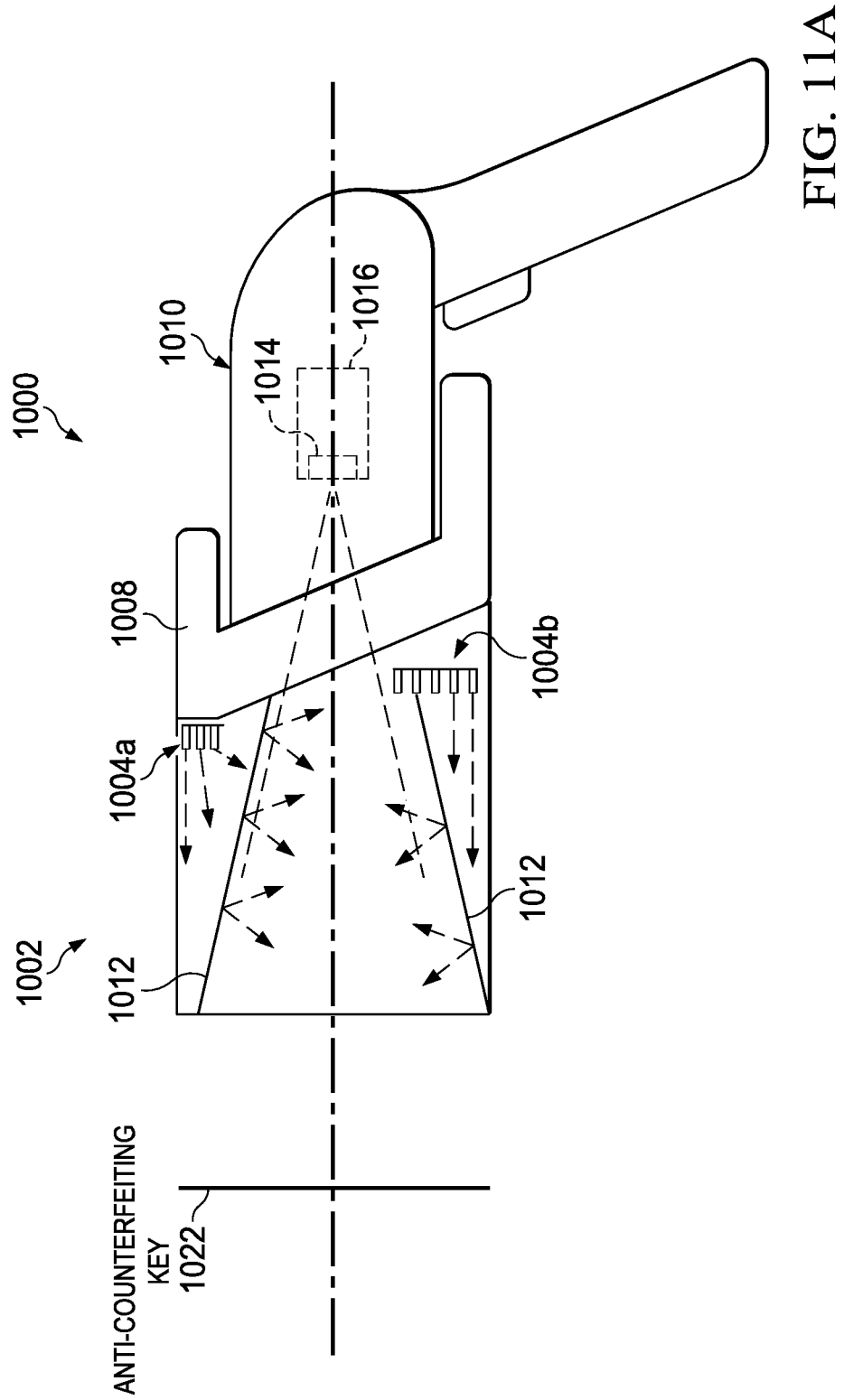

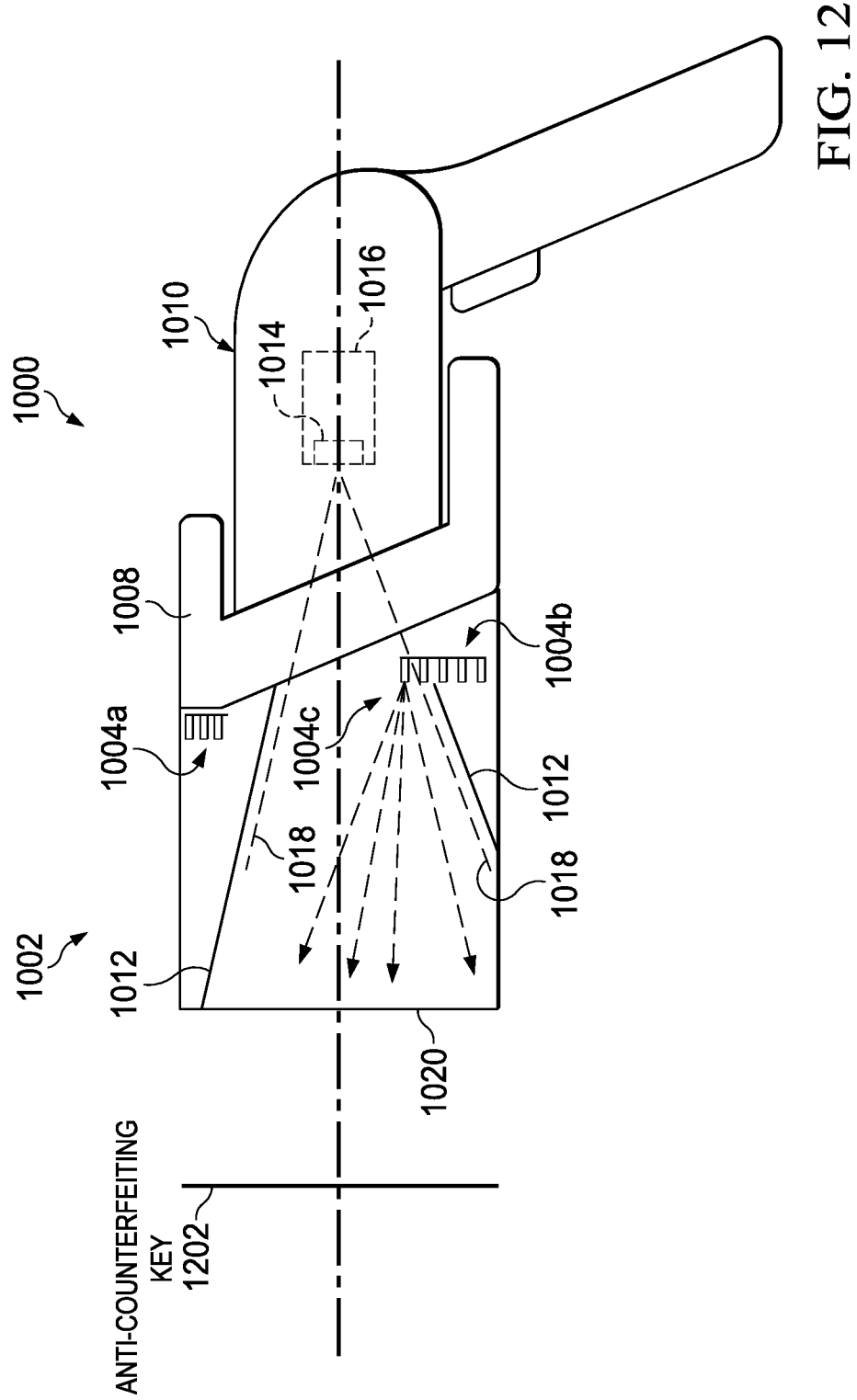

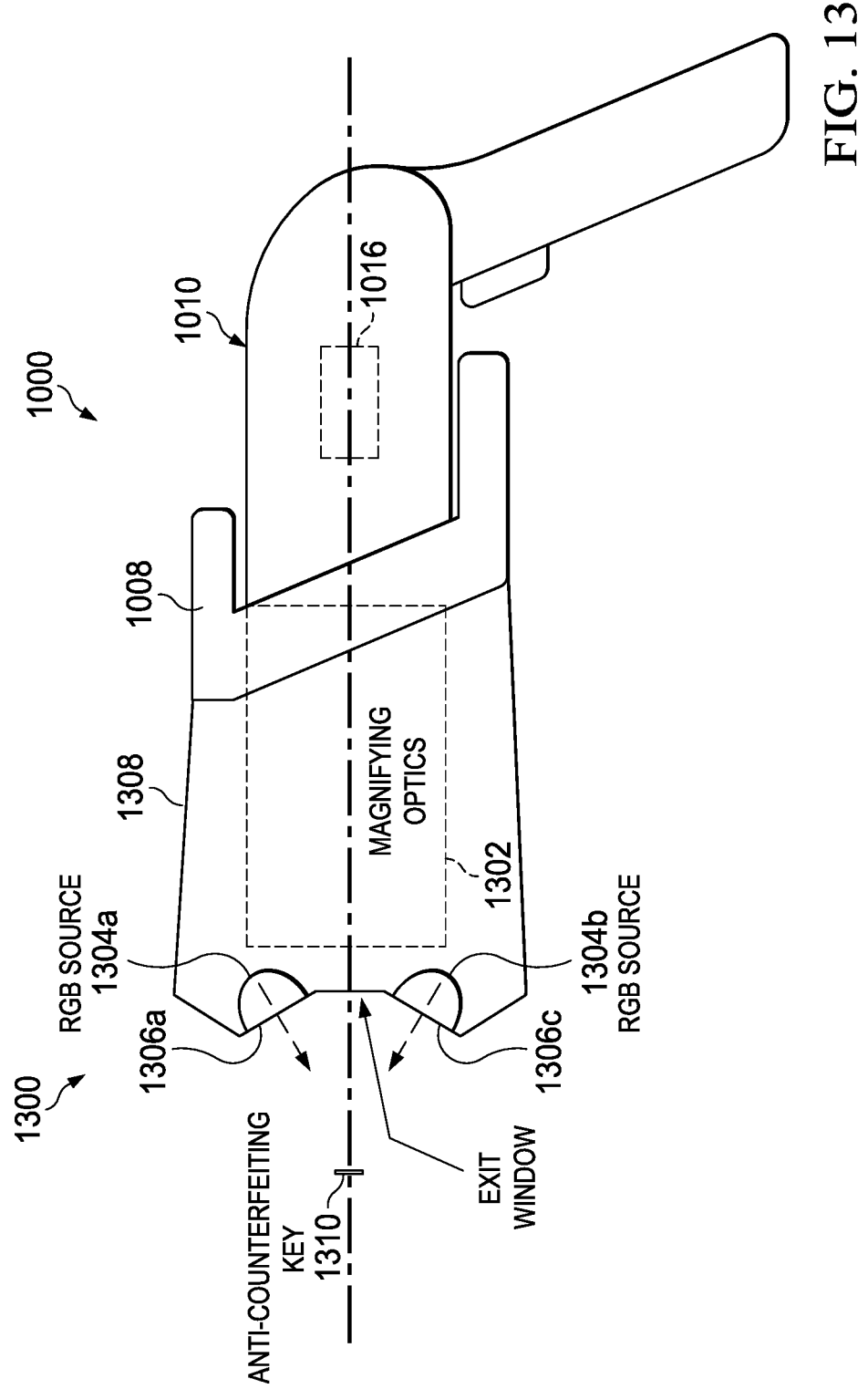

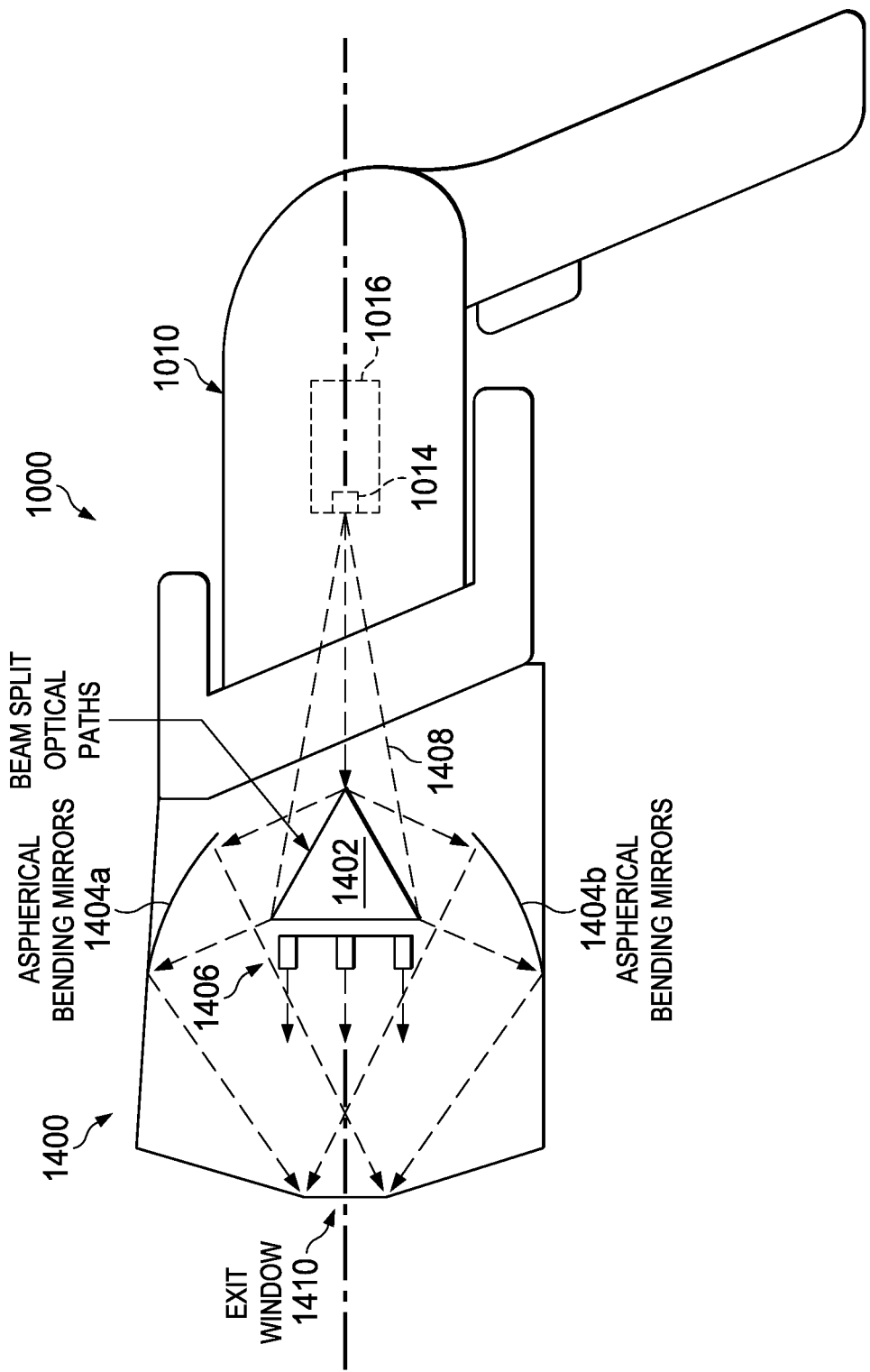

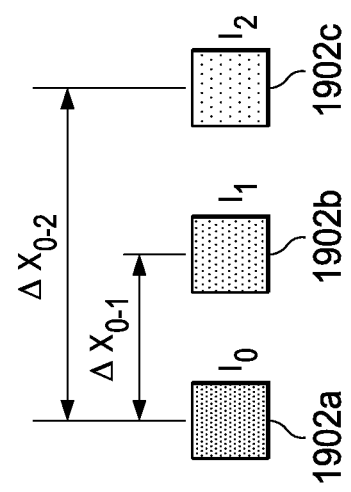
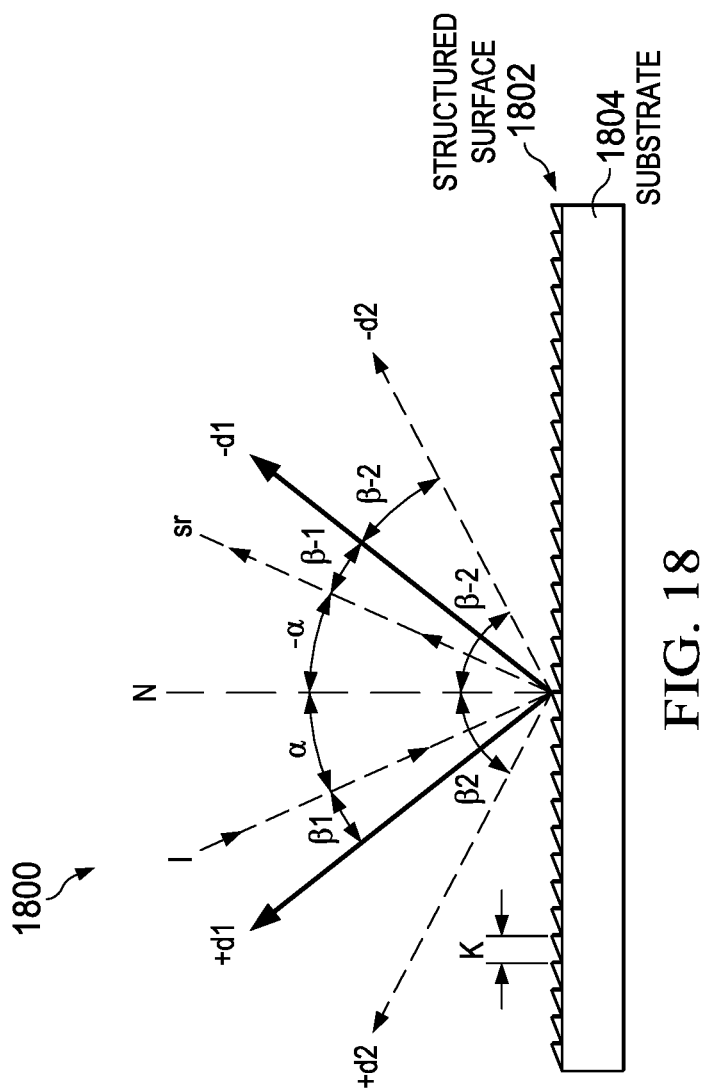
FIG. 19
FIG. 18

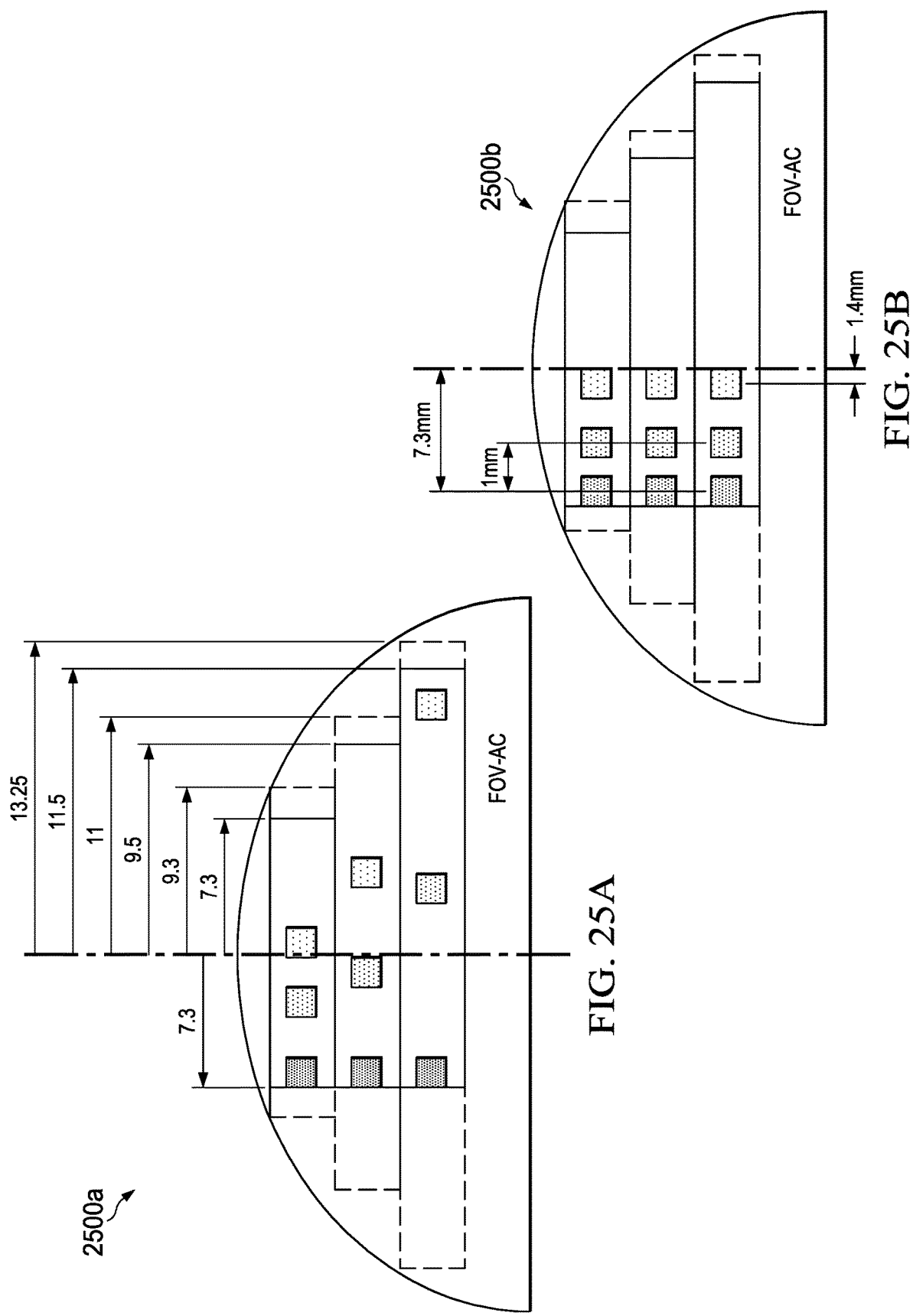

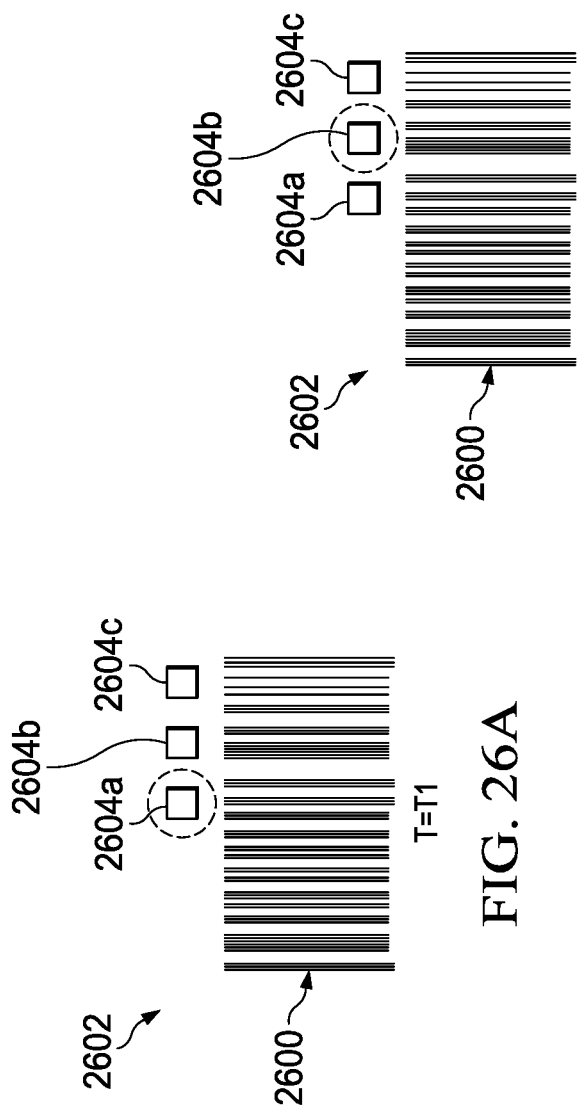
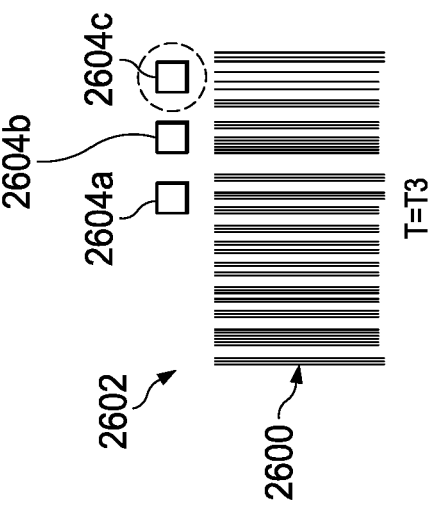

ANTI-COUNTERFEITING BARCODE READER AND ASSOCIATED METHODS

FIELD OF THE INVENTION

The present invention relates to anti-counterfeiting devices, and more specifically, to anti-counterfeiting barcode readers.

BACKGROUND OF THE INVENTION

Machine readable indicia ("indicia"), such as barcodes, QR codes, etc., are labels containing coded information. Machine readable indicia are used in a wide variety of applications ranging from product traceability to product identification. Indicia can be printed by common printing technologies, which facilitates wide use and, at the same time, easy replication for counterfeiting purposes. For example, it is possible to replicate an indicia of an authentic product and attach the indicia over a counterfeited product. The issue of protection against counterfeit products is well known.

A number of anti-counterfeiting systems have been available. These conventional anti-counterfeiting systems typically use inks that are readable only through the use of being illuminated by a specific wavelength. For example, the ink may be visible when illuminated with an intense near-infrared light source radiation.

There are many aspects that must be considered when choosing a technology to be used for the construction of an anti-counterfeiting key. The quality of an anti-counterfeiting key has to be evaluated in close relation to the product that is to be protected. In particular, the cost of an anti-counterfeiting key should be a low percentage cost as compared to the price of the product, but at the same time, replication of the anti-counterfeiting key should represent a high percentage of cost to counterfeit the product.

There are two main considerations for developing a standardized anti-counterfeiting system, including:

1) costs of products: products that have to be protected by an anti-counterfeiting system typically include a wide range of price levels and manufacturing quantities. Product production quantities range from large-scale product production to limited run production. The anti-counterfeiting key should use a technology capable of responding flexibly to product pricing and different levels of production quantities. If the considered technology is not sufficiently flexible, then the anti-counterfeiting system may have a non-negligible percentage impact to the price of some product types, which would likely not be a commercially viable solution.

2) anti-counterfeiting key technology: the technology of the anti-counterfeiting key has to be able to evolve over time in order to better ensure a certain level of security. More specifically, an anti-counterfeiting key has to be created by a technology that is able to evolve features over time by using production processes that become increasingly complex. If the considered technology does not have the ability to evolve using new replication technologies, the investment needed to replicate the anti-counterfeiting key by counterfeiters may become lower over time, and, consequently, the value of the anti-counterfeiting protection will decrease.

Despite the inherent technological issues that are faced in creating an anti-counterfeiting technology, the need to protect products against counterfeiting is growing more and more. Such products that are well-known to be protected from counterfeiting range from medicine to clothing brands to airplane parts, just to name a few.

In order to make effective protection against counterfeiting, the anti-counterfeiting key should be created through methodologies or techniques not easily replicable by a would-be counterfeiter. Properties of an anti-counterfeiting system may include:

(i) an ability to read a code contained in an anti-counterfeiting key that is uniquely associated to a single product and possibly with difficulty to be accessed by the counterfeiter; and (ii) the building of an equipment able to replicate anti-counterfeiting keys should represent a cost not advantageous compared to the profit obtainable from counterfeiting a product.

Based upon above-listed properties, the effectiveness of an anti-counterfeiting system generally depends on production volume of a product and the cost of a single product. Two illustrative extreme cases include (i) large-scale product production in terms of quantity with low cost of a single product, or (ii) low-scale product production in terms of quantity and with high cost of a single product.

In the first case, an anti-counterfeiting system may include the use of expensive anti-counterfeiting key manufacturing tooling because the cost of the tooling can be subdivided into a large number of products with the ability to produce keys fast because the manufacturing tooling has to manufacture many keys. In the second case, the cost of the tooling should not be cost prohibitive because the anti-counterfeiting keys have to be subdivided in only a few products, but, at the same time, the cost of the anti-counterfeiting keys can be higher given that the cost of a single product is high.

Until now, a number of efficient anti-counterfeiting systems for individual product type have been produced. Unfortunately, these anti-counterfeiting systems lose their effectiveness if used for other types of products with different production volumes and different cost of a single product. The development of anti-counterfeiting systems against counterfeiting are always very different and unrelated to each other, and such peculiarity has generally prevented the creation and development of a standard anti-counterfeiting system that is common to all product types, as described above.

Accordingly, there is a need to produce an anti-counterfeiting key using a technology that is cost-effective over a wide range of product prices and production rates along with a high-level of security that is not easily reproduced and has additional complexity that can be added. Moreover, there is a need to produce an anti-counterfeiting system that is cost-effective and can effectively read the anti-counterfeiting keys and be easily adapted to read keys that change over time to stay ahead of infringing products.

BRIEF SUMMARY OF THE INVENTION

An anti-counterfeiting hardware assembly that reads anti-counterfeiting keys may use a standard barcode reader adapted to read the anti-counterfeiting keys. In adapting the standard barcode reader, a mechanical interface, such as frame or other adapter, may be mounted to a housing of the barcode reader. The mechanical interface may include electronics, such as a processor and supporting active electro-optic electronic devices (e.g., illumination devices). The mechanical interface may also include passive optical devices, where the active and/or passive optical devices may be used to support a number of anti-counterfeiting technologies that may be used to produce an anti-counterfeiting key.

As a result of the configuration of the anti-counterfeiting hardware assembly, an anti-counterfeiting key may be positioned in proximate location to a machine-readable indicia such that the hardware assembly is able to read both the machine-readable indicia and anti-counterfeiting key substantially simultaneously. In an embodiment, the anti-counterfeiting key is composed of multiple diffractive gratings that diffract a coherent illumination source to illuminate a diffractive pattern onto an image sensor of the barcode reader to enable verification and reading of a code as formed by the anti-counterfeiting key.

One embodiment of a code reader may include a light source configured to illuminate a machine-readable indicia representative of a standard code associated with an item. An image sensor may be configured to receive an image of the machine readable indicia. An illumination source may be configured to illuminate an anti-counterfeiting key that, when illuminated by the illumination source, reflects the illumination from the illumination source to be incident on the image sensor. A processing unit may be in electrical communication with the image sensor, and may be configured to decode the standard code of the machine-readable indicia and check validity of the reflected illumination from the anti-counterfeiting key.

One embodiment of an anti-counterfeiting module for use with a code reader may include a member configured to detachably couple with the code reader, and an illumination source may be configured to be supported by the member, and to illuminate an anti-counterfeiting key.

One embodiment of a barcode reader accessory may include a member configured to removably engage a barcode reader, and support reading an anti-counterfeiting feature disposed in proximate location to a machine-readable indicia.

One embodiment of a code reading system may include a memory configured to store anti-counterfeiting protection data, an image sensor, and a processing unit in communication with the memory and the image sensor. The processing unit may be configured to capture an image of a machine-readable indicia incident on said image sensor, capture a diffractive pattern incident on said image sensor, process the imaged machine-readable indicia to determine a code represented thereby, and validate the anti-counterfeiting key based on the captured diffractive pattern.

A method may include capturing an image of a machine-readable indicia and a diffractive pattern. The machine-readable indicia may be processed to determine a code represented thereby. An anti-counterfeiting key may be validated based on the captured diffractive pattern.

One embodiment of an article may include a machine-readable indicia associated with the article. An anti-counterfeiting key may be proximately located with the machine-readable indicia so as to be read by a code reader at substantially the same time as the machine-readable indicia.

BRIEF DESCRIPTION OF THE DRAWINGS

Illustrative embodiments of the present invention are described in detail below with reference to the attached drawing figures, which are incorporated by reference herein and wherein:

FIGS. 1A and 1B are illustrations of a conventional barcode reader positioned on a stand that enables a user to operate the reader in a fixed or handheld position, where the stand may be configured to assist in imaging an anti-counterfeiting key in proximity with a machine-readable indicia;

FIGS. 3A-3D are illustrations of the stand and barcode reader in the configuration of FIG. 2B showing a scanning process being performed for reading a machine-readable indicia and anti-counterfeiting key;

FIG. 4A is an illustration of an illustrative stand and barcode reader, where the stand may be configured to assist in supporting the barcode reader to detect and validate an anti-counterfeiting key formed of diffractive grating(s);

FIGS. 8A and 8B are illustrations of illustrative barcode reader assemblies including a barcode reader, and showing optical path differences without and with a diffusive sheet;

FIGS. 11A-11C are schematic views of the kit of FIGS. 10A and 10B that successively creates a uniform distribution of red, green, and blue light sources that are reflected from an anti-counterfeiting key to a camera of the barcode reader;

FIG. 12 is a schematic view illustration of the assembly and kit of FIGS. 10A and 10B that illustrates illumination of the invisible sources (e.g., IR and UV) to activate luminescent inks of an anti-counterfeiting key;

FIG. 13 is an illustration of an illustrative reading assembly embodiment in which a kit configured with a magnifying system for use in transforming the barcode reader into a microscope along with light source(s) for imaging an anti-counterfeiting key;

FIG. 14 is an illustration of an illustrative embodiment in which a beam splitter and aspherical bending mirrors and light source(s) are used for imaging an anti-counterfeiting key by a barcode reader;

FIG. 18 is an illustration of an illustrative diffractive grating assembly with a diffractive grating disposed on a substrate that reflects an incident illumination source into diffractive orders;

FIG. 19 is an illustration of spots of a diffractive pattern generated from reflected diffractive orders from a diffractive grating of an anti-counterfeiting key;

FIGS. 25A and 25B are illustrations of illustrative sets of reflected diffractive orders from an anti-counterfeiting key imaged onto an image sensor and physical alignment thereof; and FIGS. 26A-26C are illustrative machine-readable indicia and anti-counterfeiting key proximately positioned therewith.

DETAILED DESCRIPTION OF THE INVENTION

Figure 2A:
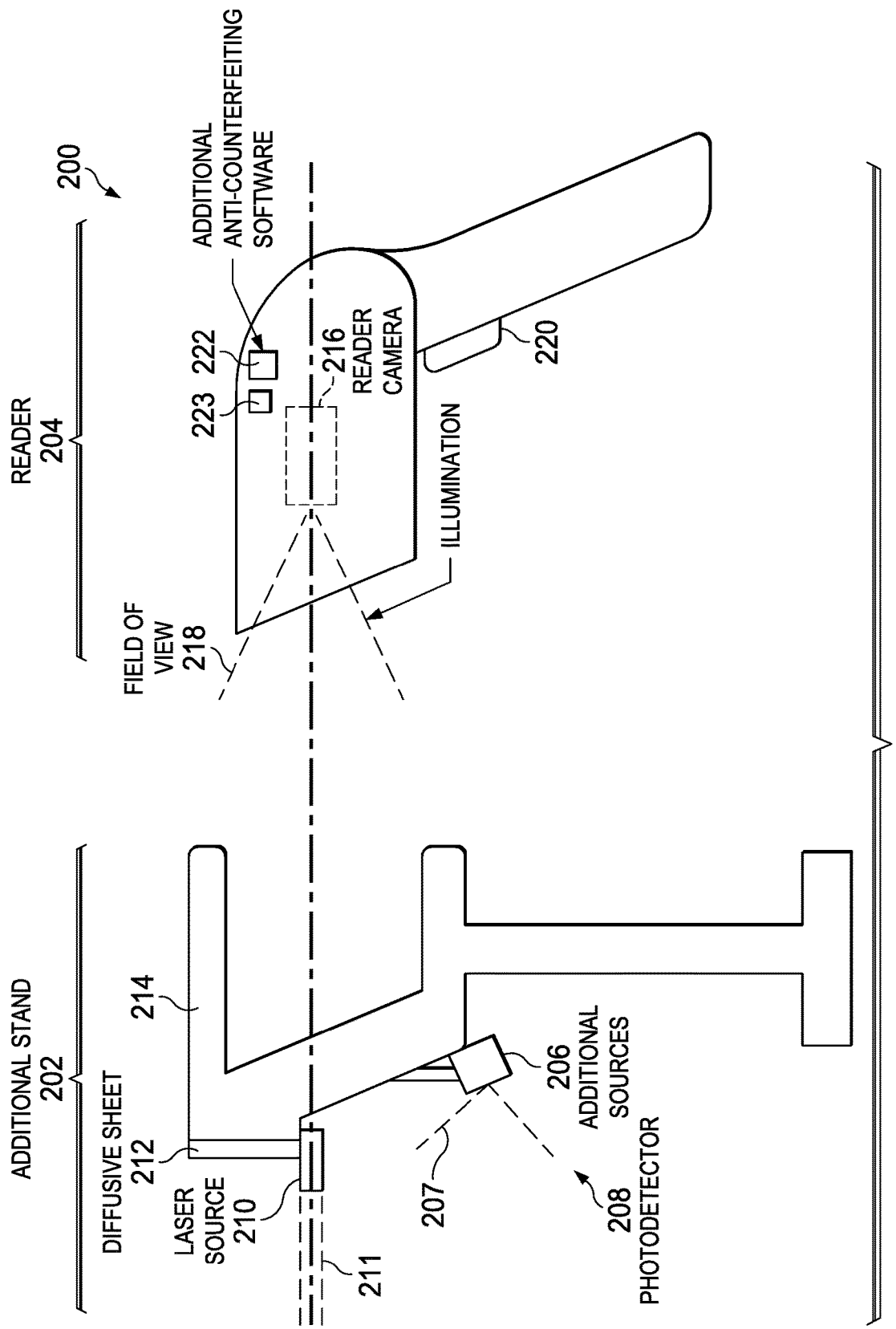
FIG. 2A is an illustration of an imaging system including a stand including anti-counterfeiting imaging and receiving devices and a conventional barcode reader configured with anti-counterfeiting key reading software.

Embodiments of an anti-counterfeiting system are discussed hereinbelow. The anti-counterfeiting system may include two main aspects, including an anti-counterfeiting key and a reader configured to read and optionally decode the anti-counterfeiting key. The key may include anti-counterfeiting data. The reader may be configured to decode the anti-counterfeiting data of the key. As understood, decoding anti-counterfeiting data of a key is not currently possible with conventional digital imagers, such as, for example, a standard imaging barcode reader, as a result of special illumination wavelengths, a special spatial configuration of light sources, or a special kind of imaging device is needed to read the key. And, because the key is to be used in environments having standard commercial and industrial barcode readers, new or modified conventional barcode readers are needed in the environments to read the key. In an embodiment, a reader configured to read and/or decode the key may be a modified conventional barcode reader to enable decoding of an anti-counterfeiting key. In one embodiment, a modular structure may enable different components to be attached to a baseline structure inclusive of a barcode reader, thereby supporting the ability to read different configurations of anti-counterfeiting keys.

With regard to FIGS. 1A and 1B, illustrations of a barcode and anti-counterfeiting reader assembly 100a and 100b inclusive of a conventional barcode reader 102 positioned on a stand 104 that enables a user to operate the reader 102 in a fixed or handheld position are shown. The stand 104 may be configured to assist in imaging an anti-counterfeiting key in proximity with a machine-readable indicia, such as a barcode, QR code, or otherwise. As shown, the stand 104 includes a mechanical interface 106 with which the barcode reader 102 releasably engages to be supported by the stand 104. The configuration of the mechanical interface is illustrative, and could have different shapes. In an embodiment, the mechanical interface 106 defines a frame that encompasses the barcode reader. However, other configurations that do not define a frame, but rather a mount or other shape or engagement member, could be utilized.

As is further described herein, the mechanical interface 106 may be configured to include or support active and passive optical mechanisms that are used in the imaging of an anti-counterfeiting key. The stand 104 is shown to include a base 108 and a neck 110 to which the mechanical interface 106 is attached and/or supported. The barcode reader 102 may include a handle 112 that a user may hold and trigger 114 that the user may engage to cause the barcode reader 102 to scan or image a machine-readable indicia (e.g., barcode, QR code, or any other code) and an anti-counterfeiting key using any of the configurations further described herein or otherwise available to be imaged and read by a reader camera 116 of the assembly 100a and 100b. In an embodiment, a conductive cord 118 may be electrically connected to communicate power and/or data signals between the barcode reader 102 and another device, such as a point-of-sale (POS) device (not shown). The barcode reader 102 may have a variety of alternative configurations, as understood in the art.

With regard to FIG. 2A, an illustration of an imaging system 200 including a stand 202 and a barcode reader or reader 204 is shown. The stand 202 may include anti-counterfeiting illumination and receiving devices, including one or more illumination sources 206, such as visible (e.g., red, green, blue, near-infrared) and/or invisible (e.g., IR and UV) illumination sources, to generate an illumination 207. A photodetector 208 may also be included to detect when an illuminator (not shown) of the barcode reader 204 turns on, thereby enabling the barcode reader 204 and illumination source(s) 206 to be synchronized for reading a machine-readable indicia (e.g., barcode) and anti-counterfeiting key proximately located with the machine-readable indicia. A coherent source 210, such as a laser, may also be used to produce a coherent beam 211 to be illuminated onto the anti-counterfeiting key, as further described herein. In an embodiment, a diffusive sheet 212 may be used for diffusing diffractive spectral reflections of the laser beam 211 from an anti-counterfeiting key, as further described herein.

The additional sources 206, photodetector 208, laser source 210, and diffusive sheet 212 may be coupled to or otherwise supported by a mechanical interface or member 214 of the stand 202 using any removable or permanent attachment mechanisms, adhesives, friction fit, or other means, so as to be properly aligned to enable reading of the machine-readable indicia and anti-counterfeiting key by the barcode reader 204. As shown the barcode reader 204 includes a reader camera 216 inclusive of an image sensor (not shown) that has a field-of-view 218 for imaging machine-readable indicia. The principles provided herein enable the reader camera 216 to be used to image both a machine-readable indicia and an anti-counterfeiting key proximately located to the machine-readable indicia. As understood in the art, the barcode reader 204 may include a trigger 220 that a user presses to activate operation of the barcode reader 204. The barcode reader 204 may further include a processor 222 that is configured to execute software stored in memory 223. In an embodiment, the software being executed by the processor 222 may include a module that is configured to process reflection signals or diffractive patterns as received from anti-counterfeiting keys, as further described herein. The processing may process data imaged by the reader camera 216 and stored in memory 223. In an embodiment, the software may be a separate software module or may be integrated into existing software of a conventional barcode reader.

Figure 2B:
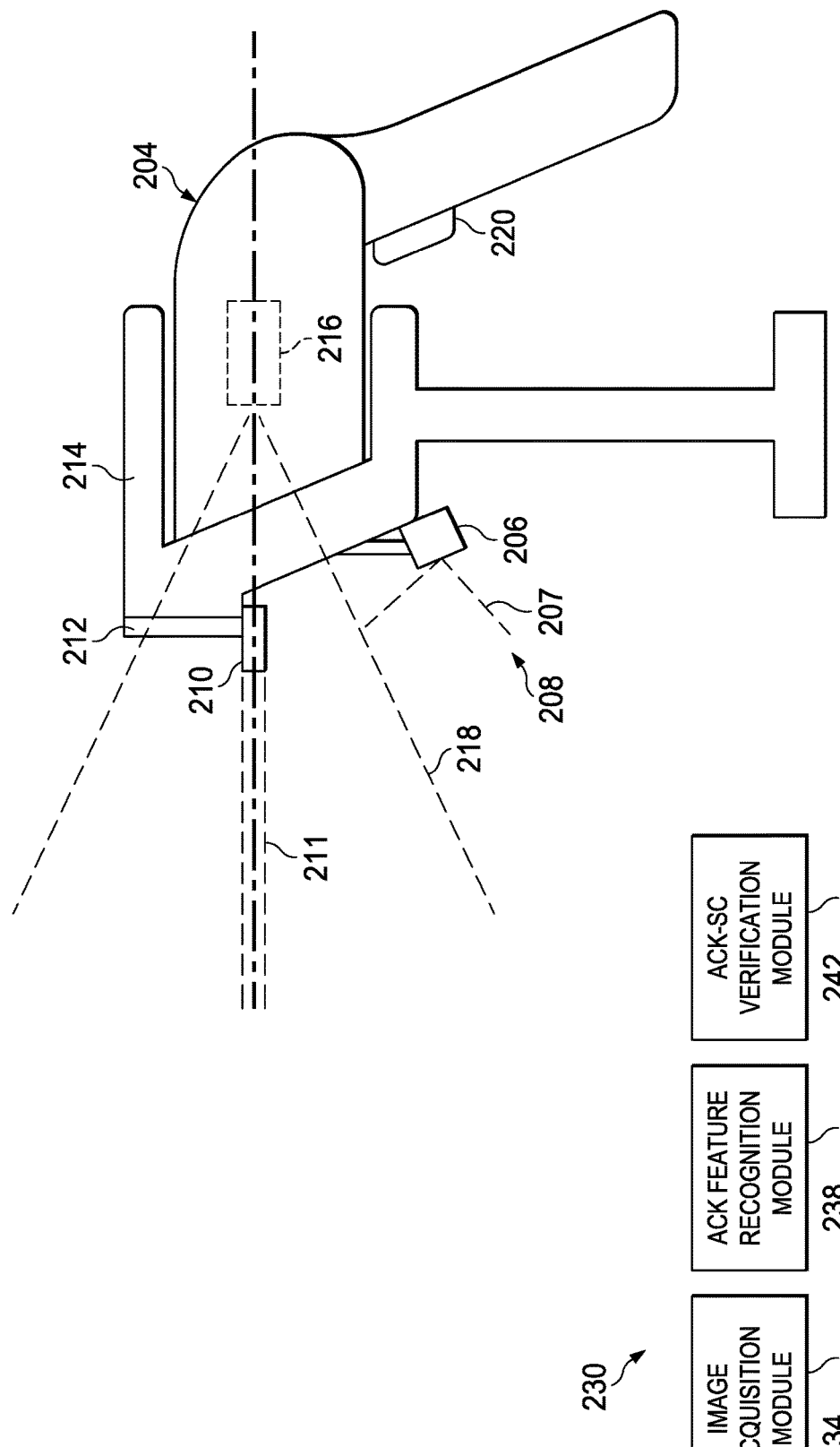
FIG. 2B is an illustration of the stand and barcode reader of FIG. 2A in an engaged position.

With regard to FIG. 2B, an illustration of the stand 202 and barcode reader 204 of FIG. 2A in an engaged position is shown. As shown, the field-of-view 218 extends to or above the diffusive sheet 212, thereby enabling reflection signals (not shown) from an anti-counterfeiting key (not shown) to be imaged onto an image sensor of the reader camera 216 that does not have a machine-readable indicia imaged thereon. In an embodiment, a top portion of the field-of-view 218 that extends through the diffusive sheet 212 may be dedicated to receiving reflections from an anti-counterfeiting key (not shown), such as a diffractive grating, to enable the reader camera 216 to read a dedicated portion of an optical sensor (not shown) for spectral diffractions reflected from anti-counterfeiting keys formed by diffractive gratings, as further described herein. It should be understood that the configuration of the illumination sources 206, photodetector 208, etc., may depend on the mechanical interface 214 that supports the barcode reader 204, which may vary depending on a mechanical configuration (e.g., housing) of the barcode reader 204.

Figure 2C:
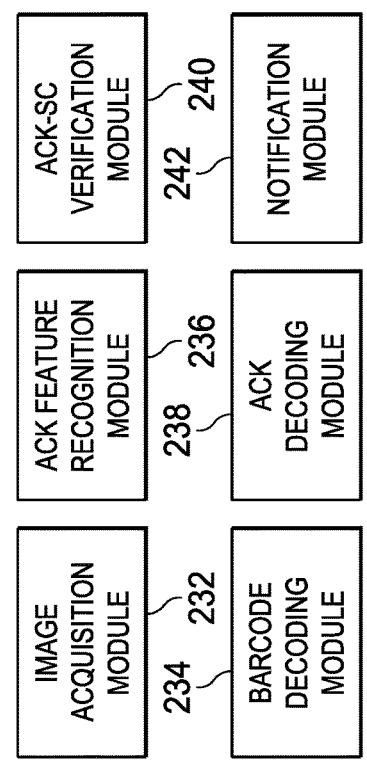
FIG. 2C is a block diagram of an illustrative set of software modules configured to operate the barcode reader to read a machine-readable indicia and anti-counterfeiting key.

With regard to FIG. 2C, a block diagram of an illustrative set of software modules 230 configured to operate the barcode reader to read a machine-readable indicia and anti-counterfeiting key is shown. The software modules 230 may be integrated into a single software program or may be individually accessible by a core software program executed by a barcode reader. In an embodiment, the barcode reader may execute a portion of the software modules 230 with one or more of the other software modules executed by a processor operating on a different platform, such as the mechanical interface 214, point-of-sale, or other device local or remote from the barcode reader.

An image acquisition module 232 is a software module that is standard on a barcode reader, and may be configured to acquire an image of a scene within a field-of-view of the barcode reader. Typically, the image acquisition module 232 is used for imaging machine-readable indicia, such as barcodes, QR codes, or other machine readable-readable indicia representative of a code, as understood in the art.

A barcode decoding module 234 is also standard on a barcode reader, and configured to decode imaged machine-readable indicia to read a code represented thereby. The module 234 may also be configured to store codes decoded from machine-readable indicia in a memory for further use by the barcode reader, as further described hereinbelow.

An anti-counterfeiting key feature recognition module 236 may be configured to recognize features of an anti-counterfeiting key based on a diffractive pattern imaged onto an image sensor, as further described hereinbelow with regard to FIG. 18, for example. The module 236 may perform distance and angle measurements in determining the features, and may be configured to identify surface profiles of diffractive grating(s) of the anti-counterfeiting key.

An anti-counterfeiting key decoding module 238 may be configured to decode an anti-counterfeiting key based on the diffractive pattern imaged onto the image sensor, as further described hereinbelow with regard to FIG. 23, for example. The module 238 may measure spacings and intensity of dots of diffractive patterns imaged onto the image sensor, for example, in determining codes of the anti-counterfeiting keys.

An anti-counterfeiting key standard code verification module 240 may be configured to verify an anti-counterfeiting key based on a number of parameters of features of the anti-counterfeiting key measured by the module 236 that may be compared to parameters stored in the barcode reader for comparison purposes. If the parameters are determined to match within a predetermined tolerance level. In an embodiment, the module 240 may also be configured to determine if a code of the anti-counterfeiting key and a standard code are mathematically associated with one another, as may be established by a manufacture of an item on which the standard code and key may be positioned.

A notification module 242 may be configured to generate a notification signal in response to the module 240 validating or verifying the anti-counterfeiting key and/or determining that the anti-counterfeiting key is associated with a standard code. The notification signal may cause an audible (e.g., tone) and/or visual signal (e.g., light) to be generated to notify a user that the item is real or counterfeit. The notification signal may additionally and/or alternatively include a message that is communicated to another device with which the barcode reader communicates.

With regard to FIGS. 3A-3D, illustrations of the stand 202 and barcode reader 204 in the configuration of FIG. 2B showing an illustrative scanning process 300a-300d (collectively 300) being performed for reading a machine-readable indicia and anti-counterfeiting key are shown. A standard machine-readable indicia 302, such as a barcode, and an anti-counterfeiting key 304 may be disposed on an object 306, such as a consumer product package or packaging of a parcel. The barcode 302 and anti-counterfeiting key 304 may be printed, adhered, or otherwise affixed to the object 306.

At step 300a, the barcode reader 204 may be aligned to image the machine-readable indicia 302 and illuminate the anti-counterfeiting key 304. In an embodiment, the anti-counterfeiting key 304 may be printed with special ink. Other technologies, such as diffractive gratings, may be used for producing anti-counterfeiting keys, as further described herein. The barcode reader 204 may scan the machine-readable indicia 302 at step 300a, and at step 300b, the barcode reader 204 may decode the machine-readable indicia 302. In an embodiment, during the processing of the indicia 302, the illumination sources 206 and 210 may stay turned off.

Figure 3B:
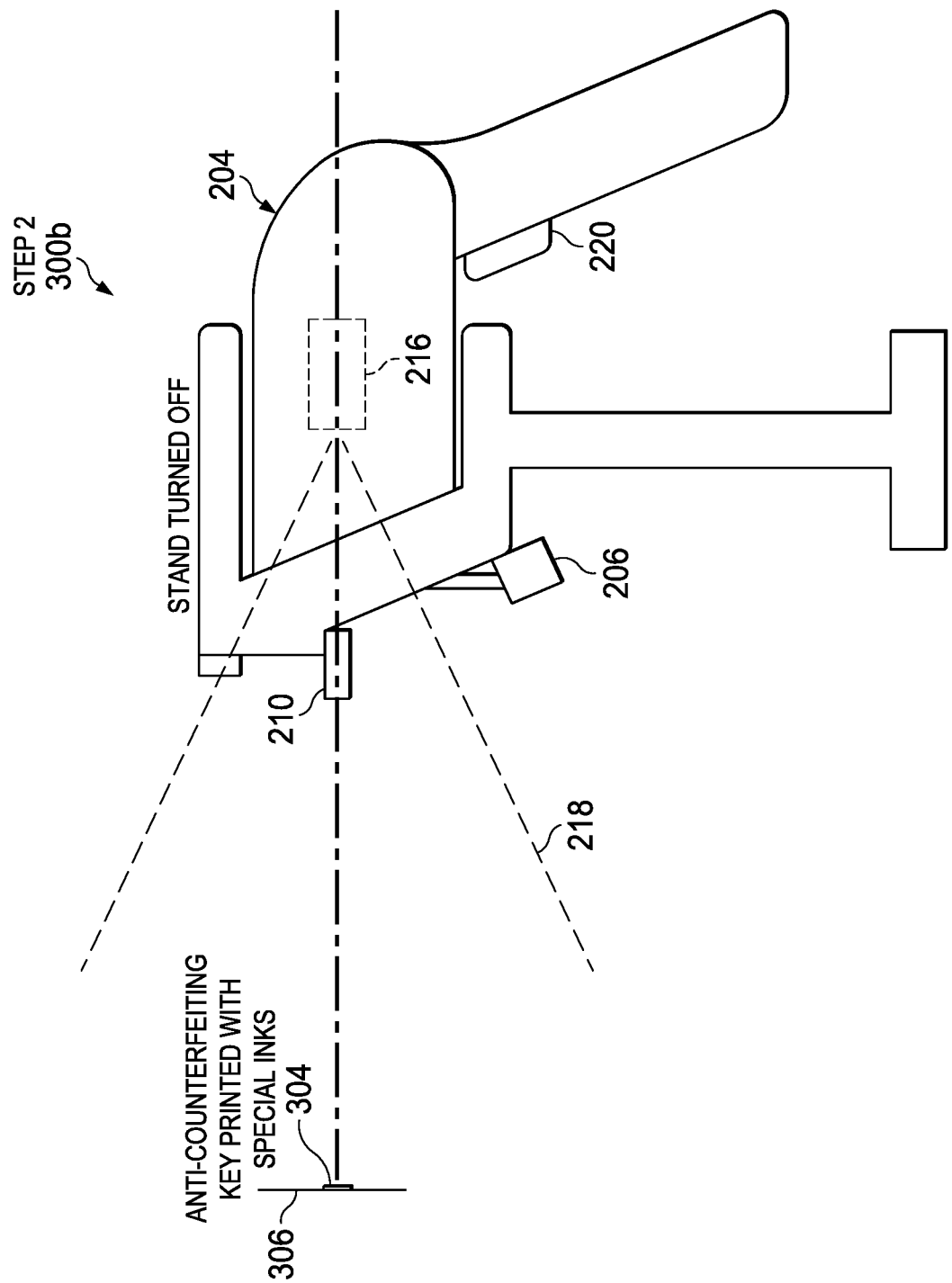
Figure 3C:
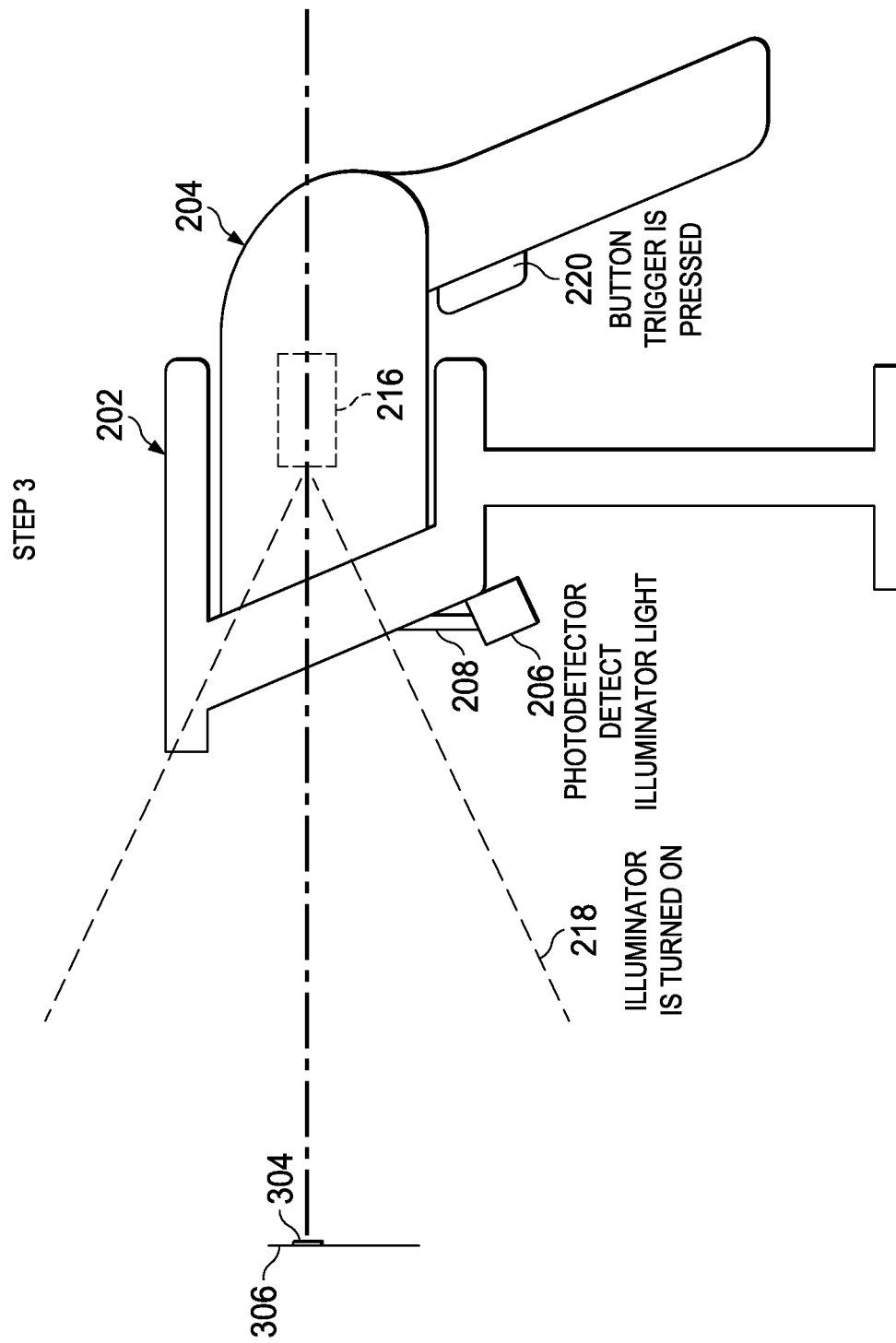

As provided in FIG. 3C, a third step 302c may be performed, where synchronization between the barcode reader 204 and stand 202 (i.e., optical components thereon) may be performed. In an embodiment, in response to a user pressing the trigger 220, an illuminator of the camera 216 of the barcode reader 204 is turned on to illuminate the field-of-view 218 to illuminate the anti-counterfeiting key 304. The photodetector 208 may detect the illuminator light that, in response, may cause the illumination source(s) 206 of the stand 202 to turn on to generate the illumination 207 at step 300d in FIG. 3D. In this case, the anti-counterfeiting key may be formed of special inks, hologram, diffractive grating, etc. on other technology of which the illumination source(s) 206 support proper reading. The camera 216 of the barcode reader 204 may be synchronized over a time interval with the illumination source(s) 206, thereby enabling the camera 216 to capture an image or reflected signal of the anti-counterfeiting key 304. Because the machine-readable indicia 302 and anti-counterfeiting key 304 are proximately positioned, the stand 202 and barcode reader 204 may be able to capture and read and/or validate both the indicia 302 and key 304 in a continuous read event that is substantially simultaneous (e.g., read the indicia 302 and then the key 304 within 1 ms or other nearly simultaneous timeframe), thereby simplifying the use of the barcode reader 204 by the user. Alternative processes may be utilized, as well.

Figure 4B:
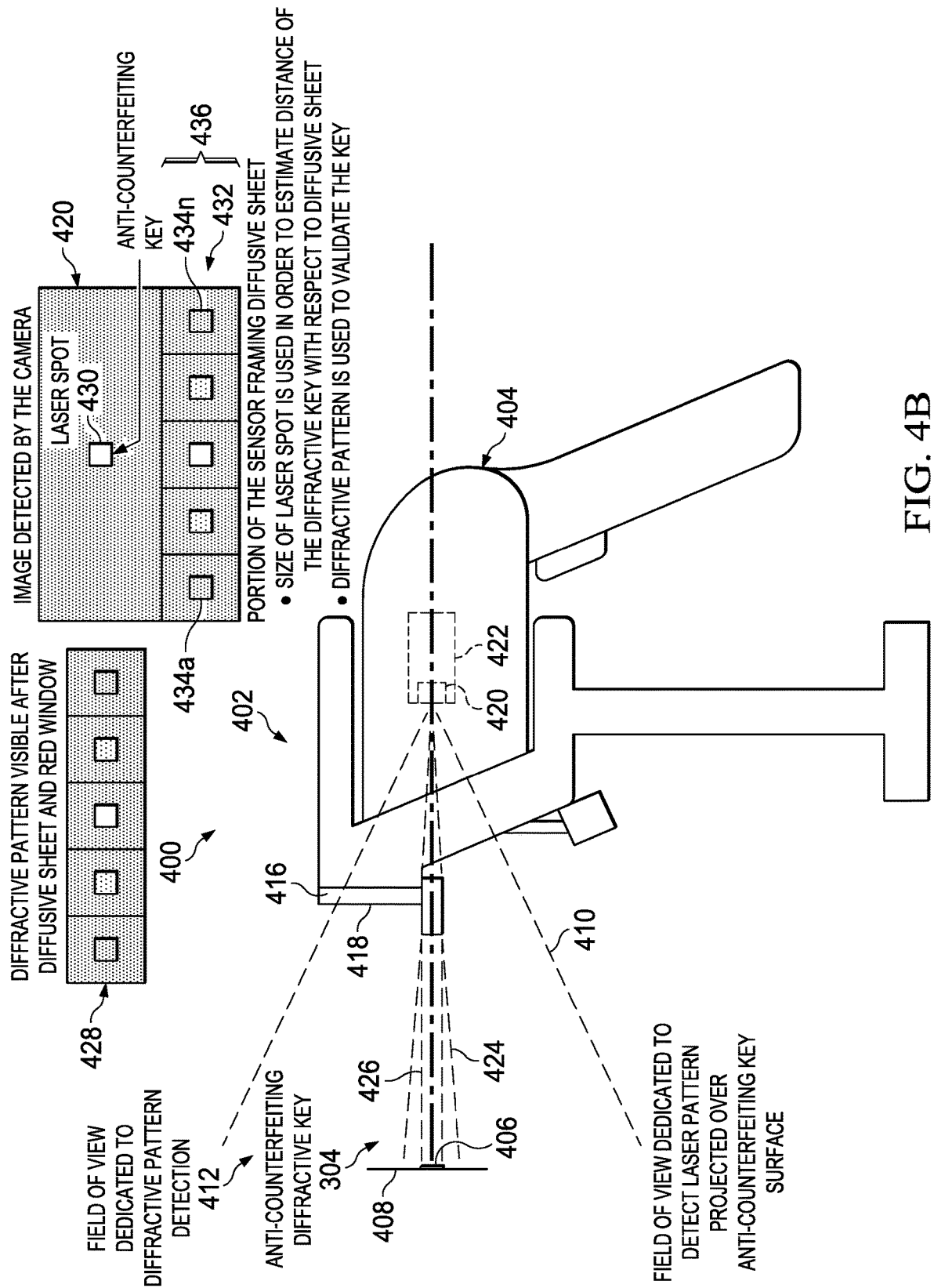
FIG. 4B is an illustration of a more detailed image of the stand and barcode reader of FIG. 4A showing an illustrative diffractive pattern from illuminating the anti-counterfeiting diffractive key.

With regard to FIG. 4A, an illustration of an illustrative stand and barcode reader assembly 400 is shown. The assembly 400 may include a stand 402 that may be configured to support a barcode reader 404 used to detect, validate, and read a code of an anti-counterfeiting key formed of diffractive grating(s) 406 on an object 408. Two fields-of-view are shown to include (i) a first field-of-view 410 that may be used to detect a laser pattern projected over the anti-counterfeiting key surface, and (ii) a second field-of-view 412 that may be used to perform a diffractive pattern detection. The second field-of-view 412 enters via a red window 416 disposed behind a diffusive sheet 418 that causes reflected diffractive patterns to be incident onto an image sensor 420 of a camera 422. The red window 416 may help reduce noise from ambient light such that a diffractive pattern reflected from an anti-counterfeiting key being read has a higher signal-to-noise ratio. In an embodiment, the red window 416 and/or diffusive sheet 418 may be specifically configured for anti-counterfeiting key(s) to read the anti-counterfeiting key(s) based on the diffractive patterns. As shown, a red laser 424 may illuminate the anti-counterfeiting key 406 with a laser beam 426. The anti-counterfeiting key 406 may include one or more diffractive gratings that diffract the laser beam 426, as further described in FIG. 4B.

With regard to FIG. 4B, an illustration of a more detailed image of the stand and barcode reader assembly 400 of FIG. 4A showing an illustrative diffractive pattern 428 from illuminating the anti-counterfeiting diffractive key 406 with the laser beam 426 is shown. The diffractive pattern 428 is shown to be visible just after the diffusive sheet 418 and red window 416. As shown, the diffractive pattern 428 is imaged onto the image sensor 420 of the camera 422. The image sensor 420 is shown to be illuminated with a laser spot 430 reflected from the anti-counterfeiting key 406 that may be used to estimate distance of the diffractive key 406 and diffusive sheet 418, and (ii) a diffractive pattern 432 with individual spots 434a-434n reflected by the anti-counterfeiting key 406 that may be used to validate the key 406. In an embodiment, the size of the laser spot 430 may be used to estimate distance of the anti-counterfeiting key 406 with respect to the diffusive sheet 418, and the specific sizes and shapes of spots of the diffractive pattern 432 may be used to validate the key 406. In an embodiment, the diffractive pattern 432 may be imaged onto the image sensor 420 below or above an imaged machine-readable indicia (not shown) being read via the image sensor 420. Other positioning of the key 406 relative to a standard code may be utilized. A portion 436 of the image sensor 420 may be established based on the field-of-view 412 dedicated to the diffractive pattern detection.

Figure 5:
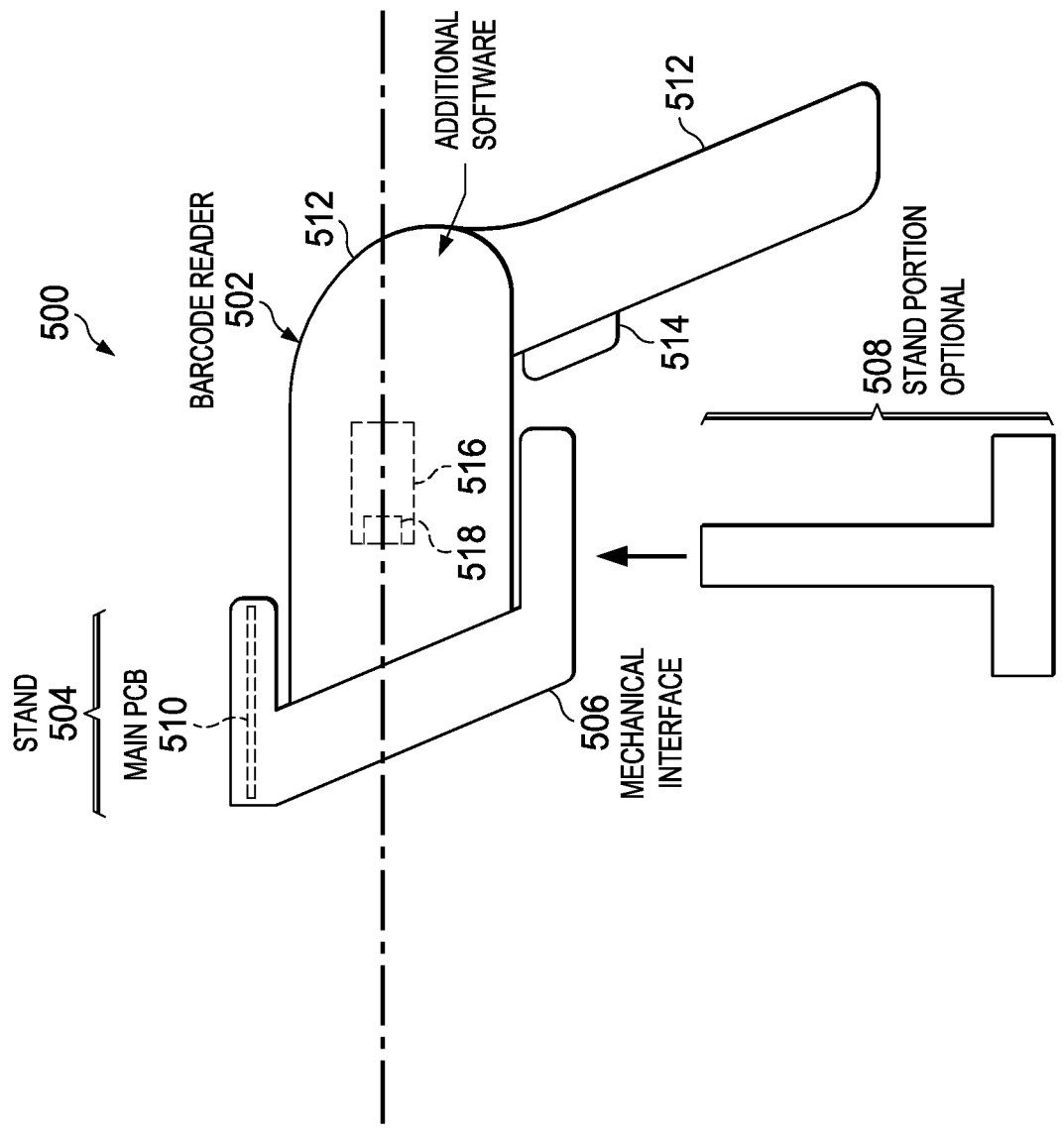
FIG. 5 is an illustration of an illustrative stand, including an optional stand portion and reader engagement portion or kit, and barcode reader ("basic package") that mechanically interface with one another and support reading machine-readable indicia and associated anti-counterfeiting keys.

With regard to FIG. 5, and illustration of an illustrative "basic package" barcode reader and stand assembly 500 inclusive of a barcode reader 502 and stand 504 on which the barcode reader 502 may be positioned is shown. The stand 504 includes a mechanical interface 506 and an optional stand portion 508. The mechanical interface 506 may include a printed circuit board 510 disposed on a top portion 512 or elsewhere on the mechanical interface 506, thereby enabling the mechanical interface 506 to be operatively utilized independent of the stand portion 508.

The printed circuit board 510 may include a microprocessor, supporting electronics, and electrical conductor paths, such as a communications and/or power bus, for communicating with other active or passive components that may be added to the mechanical interface 506, as further described herein. Alternatively, the printed circuit board may be formed of analog and/or static logical gates. The printed circuit board 510 may also include non-transitory memory (not shown) to store software and/or data. The PCB 510 may be configured to receive signals from an active optical sensor (see FIGS. 4A and 4B) to synchronize active optical illumination device(s) (see FIGS. 4A and 4B) that may be 'add-on' features as part of a "kit" (see FIG. 6) to the "basic package" barcode reader and stand assembly 500 with the operation of the barcode reader 502 in performing verification and reading of an anti-counterfeiting key associated with a machine-readable indicia. The printed circuit board 510 may be configured to support a variety of 'add-on' kits for imaging different technologies used to form anti-counterfeiting keys. It should be understood that the use of the barcode reader and stand assembly 500 may also provide for reading machine-readable indicia or anti-counterfeiting key independent of one another. As shown, the mechanical interface 506 may be configured to be removably connected from the stand portion 508 to enable the barcode reader 502 to be hand-held by a user.

In an embodiment, additional software may be installed in the barcode reader 502, and be configured to interface with the standard software originally installed by a barcode reader supplier. The additional software may further be configured to include a decoding library dedicated to decoding available anti-counterfeiting keys. Software module(s) may be dedicated to communicating with the printed circuit board 510 for communicating electronic signals with one or more optical components added to the mechanical interface 506. In addition, the additional software may include a data repository or database provided by a supplier of the anti-counterfeiting keys or by a customer (e.g., retailer) using an authentication process for ensuring that objects with anti-counterfeiting keys are authentic or indicative of the associated object being authentic.

Figure 6:
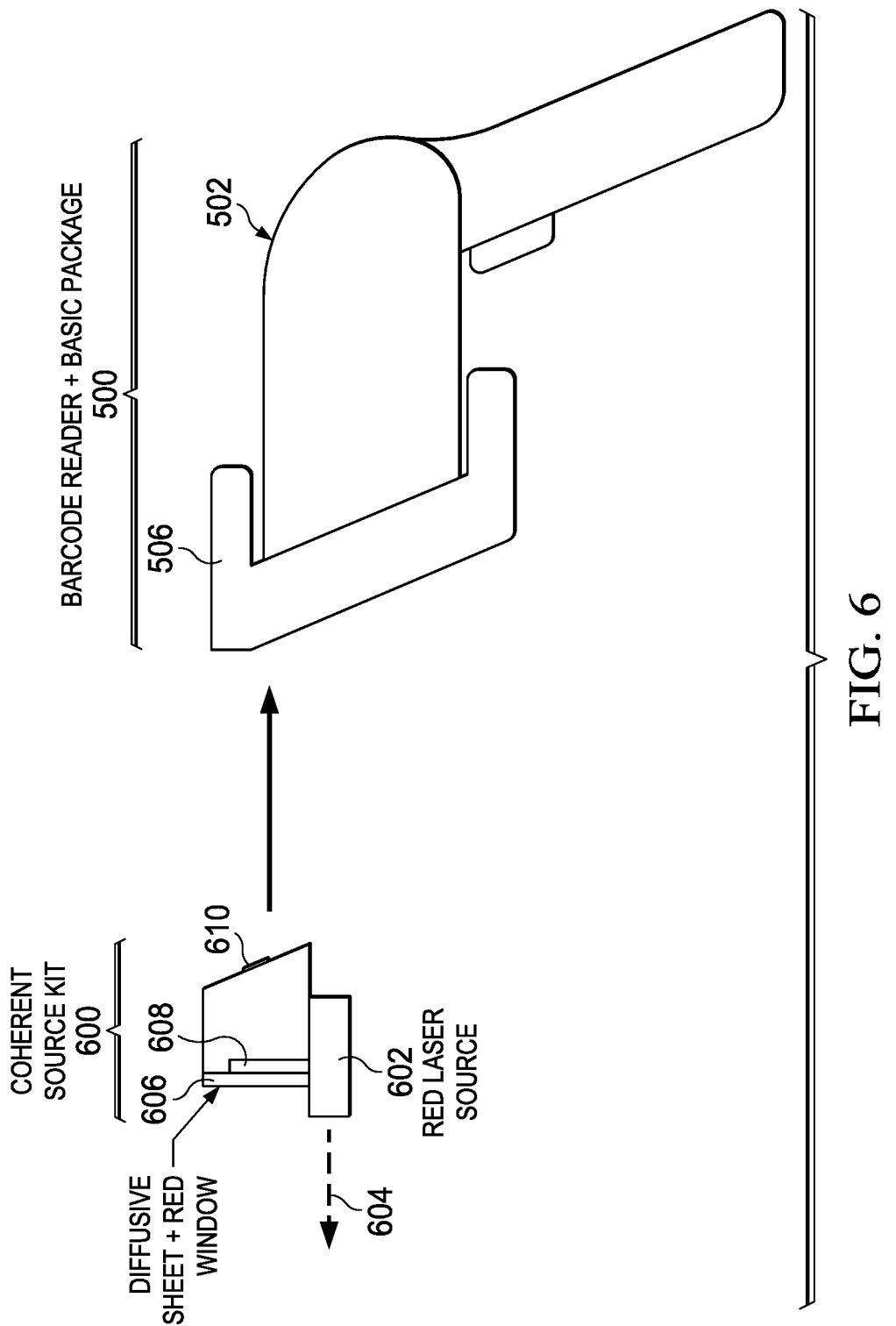
FIG. 6 is an illustration of an illustrative coherent source kit that may be used with the basic package of FIG. 5 to support imaging machine-readable indicia and associated anti-counterfeiting keys.

With regard to FIG. 6, an illustration of an illustrative coherent source kit 600 that may be used with the basic package 500 of FIG. 5 to support imaging machine-readable indicia and associated anti-counterfeiting keys is shown. The coherent source kit 600 may include active and passive optical components, including the coherent source 602, such as a red laser, configured to generate a red laser beam 604 to illuminate an anti-counterfeiting key (not shown), such as one or more diffractive gratings. The coherent source 602 may be a laser diode or a source with a higher degree of coherence. A diffusive sheet 606 and red window 608 may also be included in the coherent source kit 600 that defuses and filters reflected signals 610 reflected from the anti-counterfeiting key, as further described herein.

The coherent source 602 may be a red laser diode with collimating optics (not shown) so as to create a collimated coherent laser beam 604. The coherent source 602 may be mechanically connected to the mechanical interface 506 in order to substantially laterally align the laser beam 604 with an optical axis of the barcode reader (see FIGS. 7A and 7B). As shown in FIG. 7B, the laser beam 604, as observed by a top view, is angled with respect an optical axis 700 of the barcode reader 502 at an angle 702. The angle 702 may be adjusted depending on reading conditions of the anti-counterfeiting key.

The diffusive sheet 606 may be configured to intercept a diffractive pattern so as to re-diffuse the reflected light such that the diffused light is imaged onto the camera 516 (see FIGS. 5, 7A, and 7B, for example) for detection thereby. In the illustrative configuration, the reader camera 516 may receive a diffractive pattern impressed over the diffusive sheet 606. The red window 608 may be configured to filter out ambient light to improve signal-to-noise ratio of the diffractive pattern impressed over diffusive sheet 606 that is incident on the reader camera 516.

To attach the coherent source kit 600 to the mechanical interface 506, a mechanical connection member 608 may be utilized between the coherent source kit 600 and mechanical interface 506. The mechanical connection member 608 may include a mechanical and electrical connector 610 to provide for a mechanical and electrical connection (e.g., power and/or signaling) to the mechanical interface 506 and coherent source kit 600. For example, a printed circuit board 510 (see FIG. 5) operating on the mechanical interface 506 may communicate with one or more opto-electronic components of the coherent source kit 600, thereby providing for synchronization between the barcode reader 502 and electronics (e.g., PCB) operating on the mechanical interface 506 and/or coherent source kit 600.

Figure 7A:
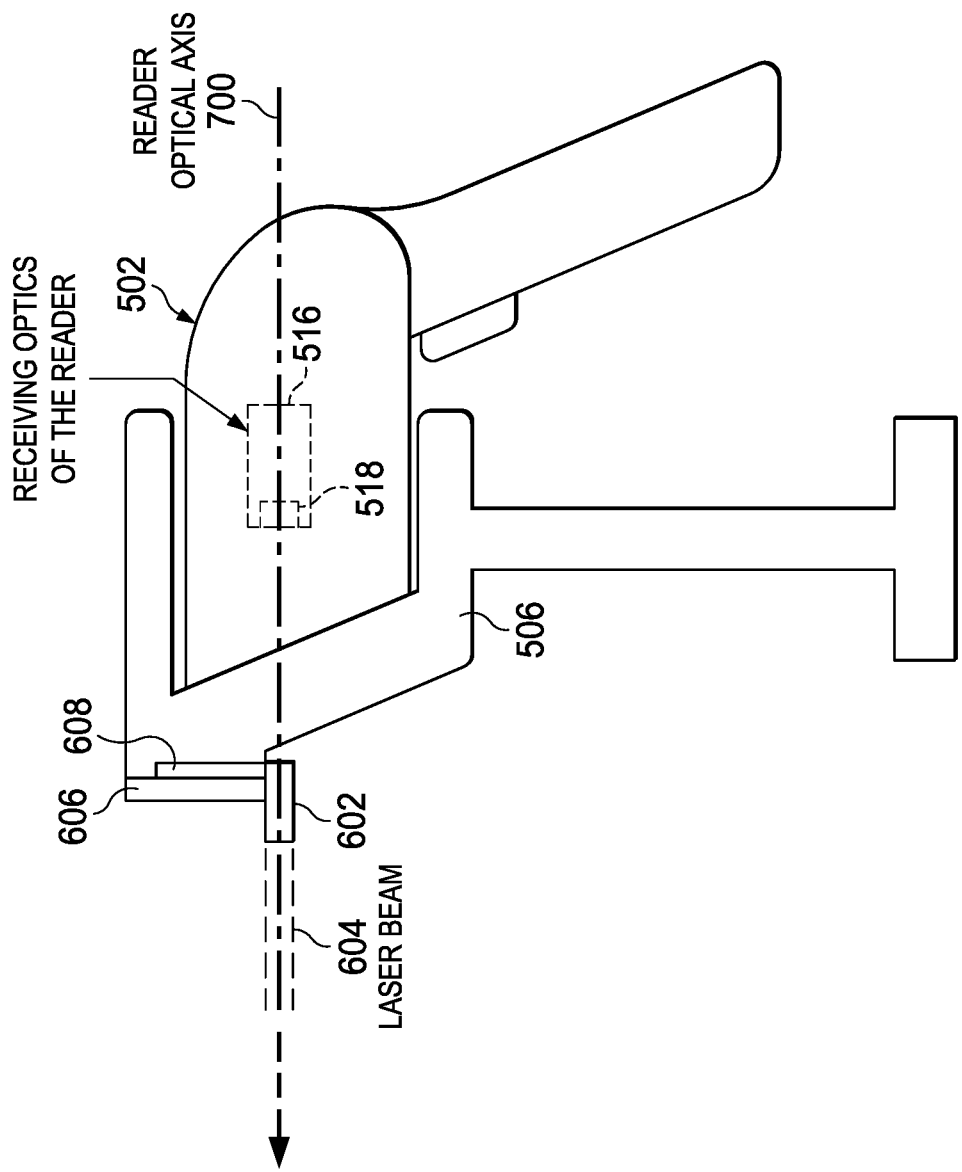
FIGS. 7A and 7B are lateral and top view illustrations of the basic package inclusive of the coherent source kit of FIG. 6.
Figure 7B:
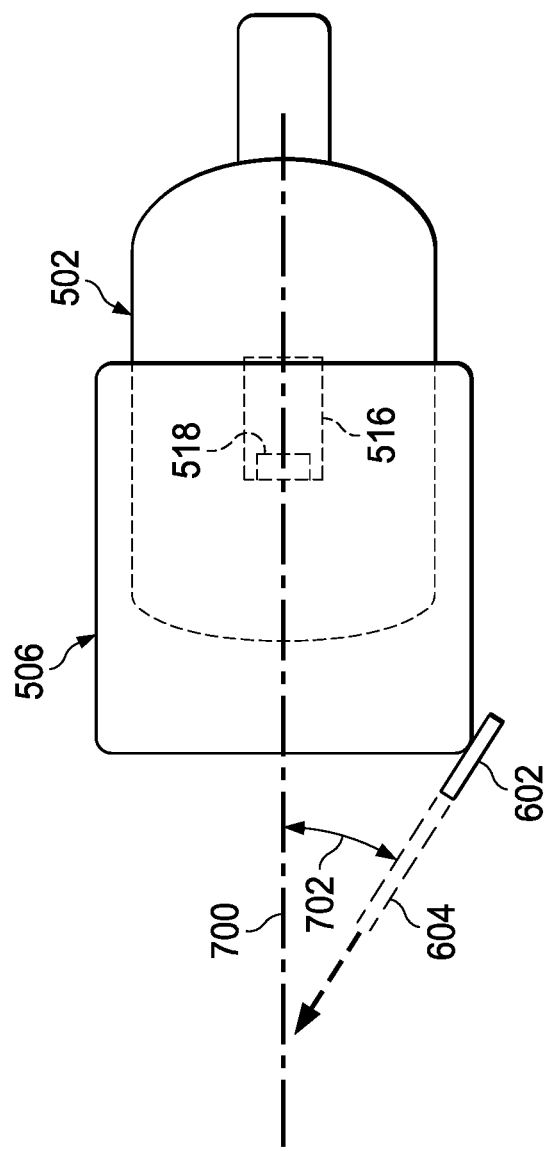

With regard to FIGS. 7A and 7B, lateral and top view illustrations of the basic package inclusive of the coherent source kit 600 of FIG. 6 are shown. As previously described, the coherent source 602 is horizontally aligned with the optical axis 700 of the barcode reader 502. Reflections, such as spectral diffractive reflections, of the laser source 604 from an anti-counterfeiting key may be incident onto the diffusive sheet 606 via the red window 608 for illumination of the reflections onto an optical sensor 518 of the reader camera 516.

With regard to FIGS. 8A and 8B, illustrations of illustrative barcode reader assemblies 800 including a barcode reader 802, and showing optical path differences without and with a diffusive sheet 804 are shown. A coherent source 806, such as a red laser, may output a source beam 808 onto an anti-counterfeiting key 810, such as a diffractive grating, positioned on an object 812. The anti-counterfeiting key 810 may reflect the source beam 808 into multiple spectral beams, including order 0 814*a*, order+1 814*b*, and order−1 814*c* (collectively 814). It should be understood that higher reflected spectral beam orders may exist, but are outside the field-of-view of the barcode reader 802 in an embodiment. As shown in FIG. 8A, the reflection beams 814 pass into the barcode reader 802, but are not incident on an image sensor 816 of a reader camera 818. As a result, the use of the anti-counterfeiting key 810 is not able to be read by the barcode reader 802. However, as shown in FIG. 8B, the reflection beams 814 that are passed through the diffusive sheet 804 are appropriately diffused to form beams 814*a'*, 814*b'*, and 814*c'* that become incident on the image sensor 816 of the reader camera 818.

Figure 9A:
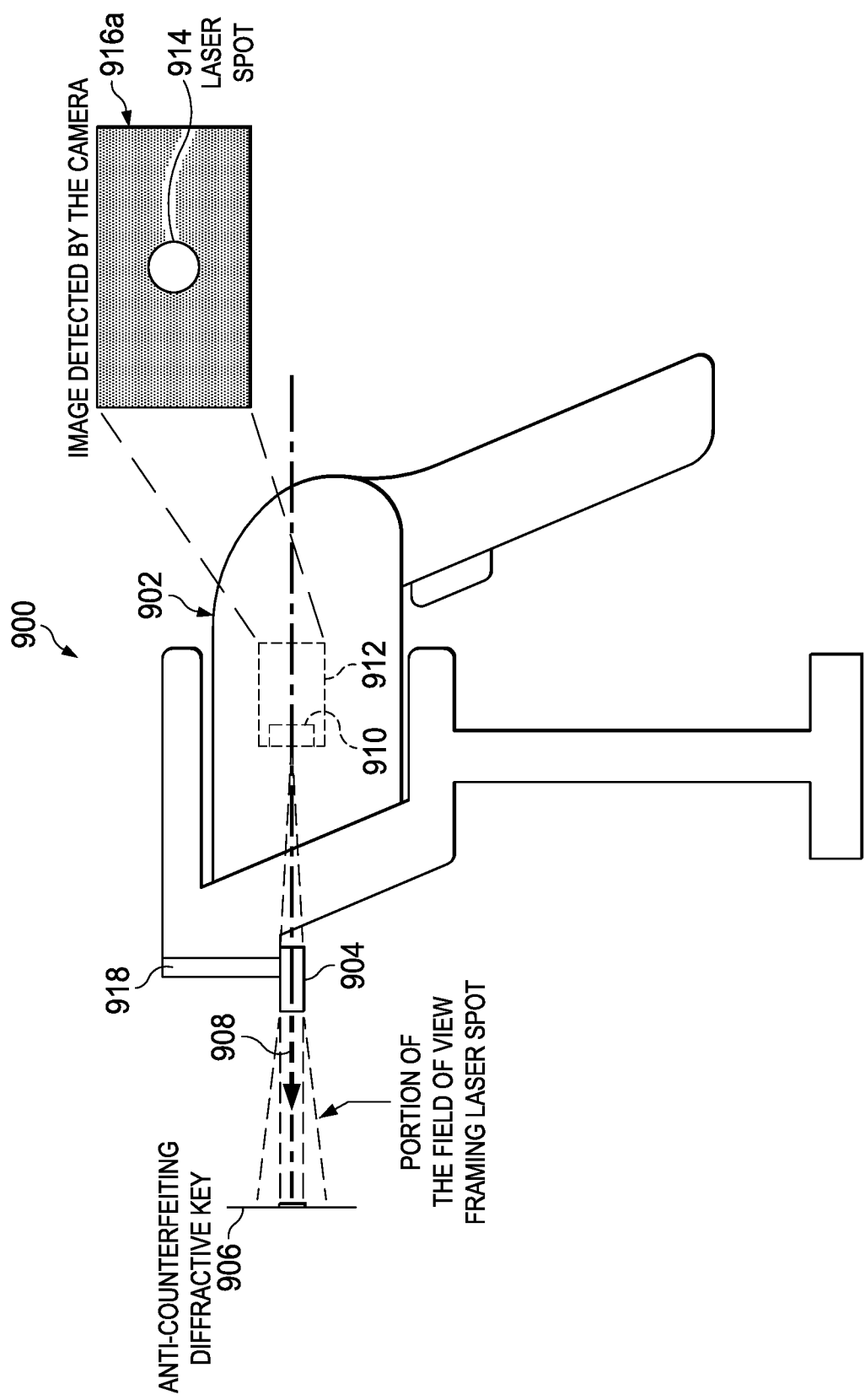
FIG. 9A is an illustration of an illustrative embodiment of a barcode reader assembly inclusive of a barcode reader and coherent source that may be used to illuminate an anti-counterfeiting key with a coherent source beam.

With regard to FIG. 9A, an illustration of an illustrative embodiment of a barcode reader assembly 900 inclusive of a barcode reader 902 and coherent source 904 that may be used to illuminate an anti-counterfeiting key 906 with a coherent source beam 908 is shown. An image sensor 910 may operate within a reader camera 912 that receives a reflection of the coherent source beam 908 to create a spot 914 on the image sensor 910 as shown in image 916*a*. In an embodiment, the turning on of an illumination source (not shown) for reading a machine-readable indicia (not shown, but in proximity of the anti-counterfeiting key 906) of the barcode reader 902 may cause the coherent source beam 908 to be turned on in response to a photodetector (see FIG. 2A) detecting the illumination source.

Figure 9B:
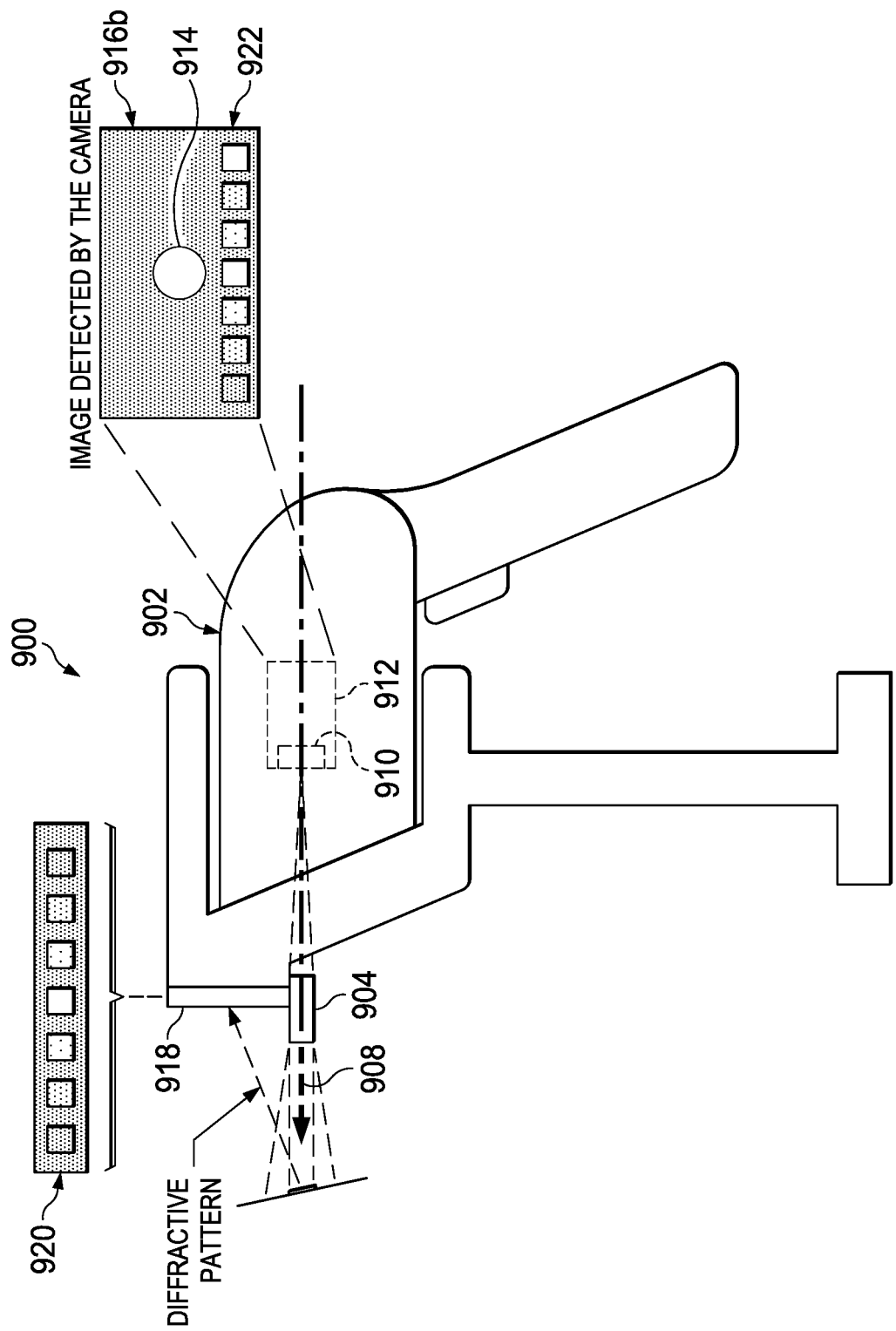
FIG. 9B is an illustration showing the coherent source beam of FIG. 9A that may be diffracted from the anti-counterfeiting key and imaged onto the image sensor by a diffusion sheet.

As shown in FIG. 9B, the coherent source beam 908 may be diffracted from the anti-counterfeiting key 906 and imaged onto the image sensor 910 by a diffusion sheet 918. As shown, a reflected diffractive pattern 920 from the diffusion sheet 918 is diffused to be incident onto the image sensor 910 and captured by the reader camera 912. The diffractive pattern 920 shows that an order 0 reflection is brightest and then the diffractive orders extending to the left and right of the order 0 reflection diminishes in illumination intensity, as shown on the image 916. An imaged diffractive pattern 922 is shown in the image 916*b* to be below the laser spot 914, but it should be understood that the image of the diffractive pattern may alternatively be positioned relative to the laser spot 914. It should also be understood that the imaged diffractive pattern 922 may be positioned in a separate region of the image sensor 910 from an image of a machine-readable indicia.

Figure 10A:
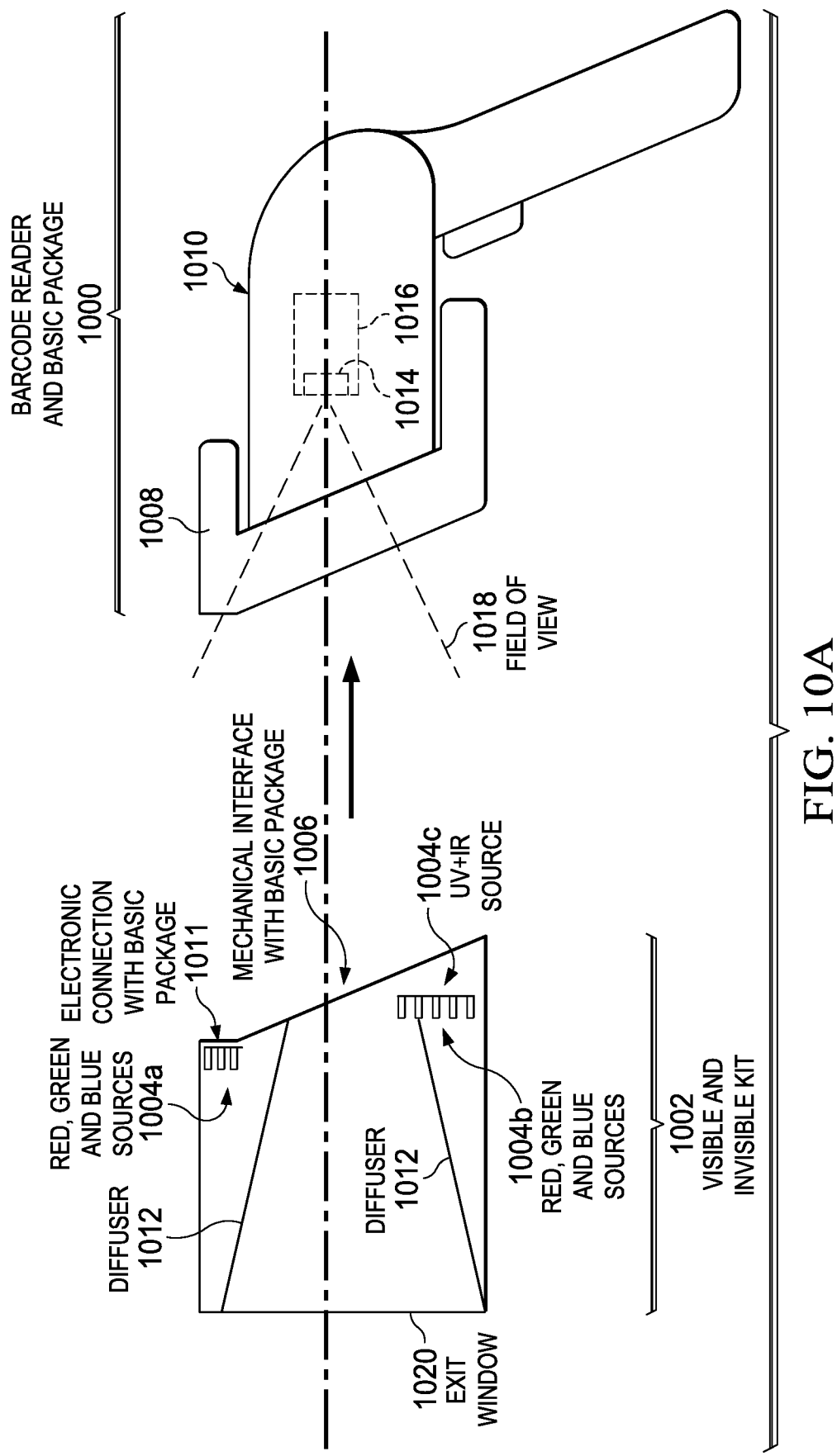
FIGS. 10A and 10B are illustrations of a "basic package" barcode reader and stand assembly along with an illustrative illumination kit.
Figure 10B:
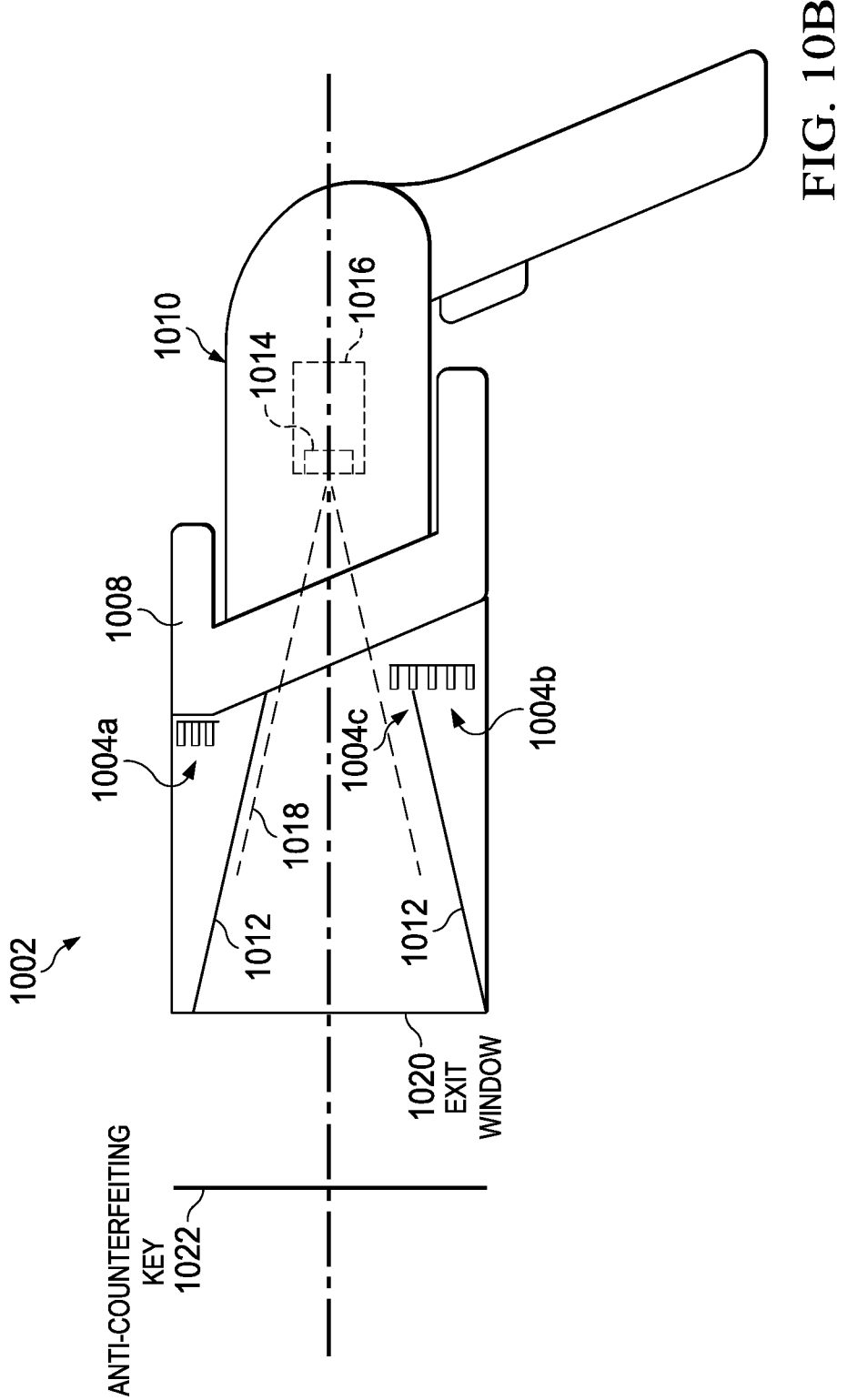

With regard to FIGS. 10A and 10B, illustrations of a "basic package" barcode reader and stand assembly 1000 along with an illustrative illumination kit 1002 are shown. The illumination kit 1002 may include multiple visible (e.g., red, green, and/or blue) illumination sources 1004*a* and 1004*b* and invisible (e.g., UV and/or IR) illumination sources 1004*c* (collectively 1004). The illumination kit 1002 may include a mechanical interface 1006 that is configured to interface with the mechanical interface 1008 of the barcode reader 1010 of the assembly 1000. An electrical connector 1011 may provide for an electrical interface with the mechanical interface 1008 that may include a printed circuit board (see FIG. 5) inclusive of a processor to enable the printed circuit board to control operation of the illumination sources 1004. The electrical connector 1011 may provide for data and power to support the illumination sources 1004 and other electronics (e.g., processor).

The different visible an invisible illumination sources 1004 may support verifying and reading different types of anti-counterfeiting keys. A diffuser 1012 may be included with the illumination kit 1002 to diffuse light from the visible illumination sources 1004*a* and 1004*b*. As shown, the invisible illumination sources 1004*c* are disposed in front of the diffuser 1012 relative to the illumination sources 1004*a* and 1004*b*. An optical sensor 1014 of a reader camera 1016 may have a field-of-view 1018 that captures images within the field-of-view 1018 that extends through an exit window 1020. In an embodiment, the field-of-view 1018 may extend in parallel to the diffuser 1012, as shown in FIG. 10B, where the illumination kit 1002 is coupled to the mechanical interface 1008 of the basic package barcode reader and stand assembly 1000.

Visible Source

The illumination kit 1002 may create a uniform distribution of red, green, and blue illumination sources (e.g., LEDs). The uniform distribution of the visible illumination sources may be obtained by a conic shape surrounding the field-of-view 1018 of the barcode reader 1010. In an embodiment, the conic shape is composed of a diffusive plastic material that forms the diffuser 1012 (see FIGS. 11A-11C), behind which reside the visible illumination sources 1004*a* and 1004*b*. In operation, the visible illumination sources 1004a and 1004b are diffused by the diffuser 1012 and exit through the exit window 1020 onto an anti-counterfeiting key 1022.

Figure 11B:
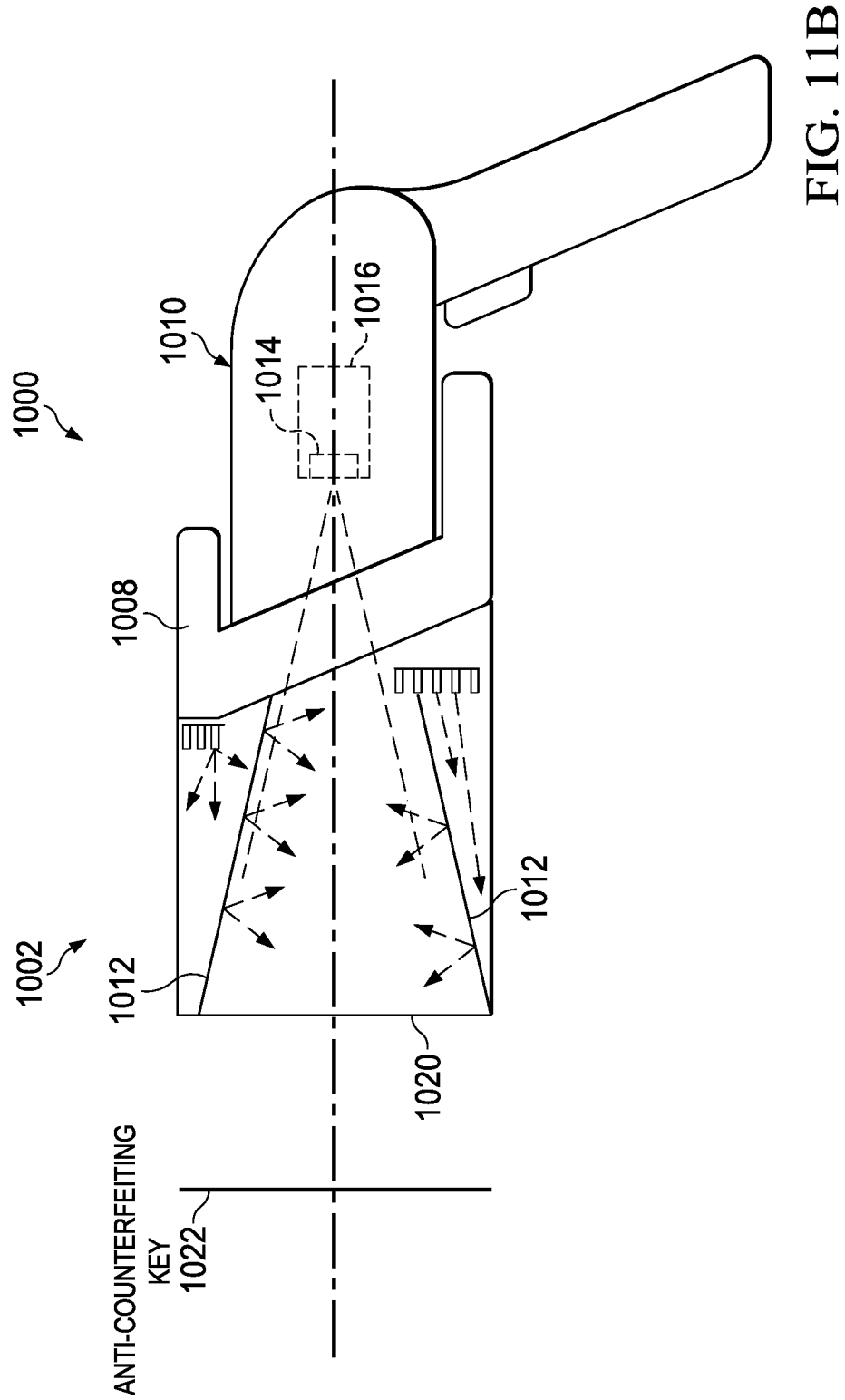
Figure 11C:
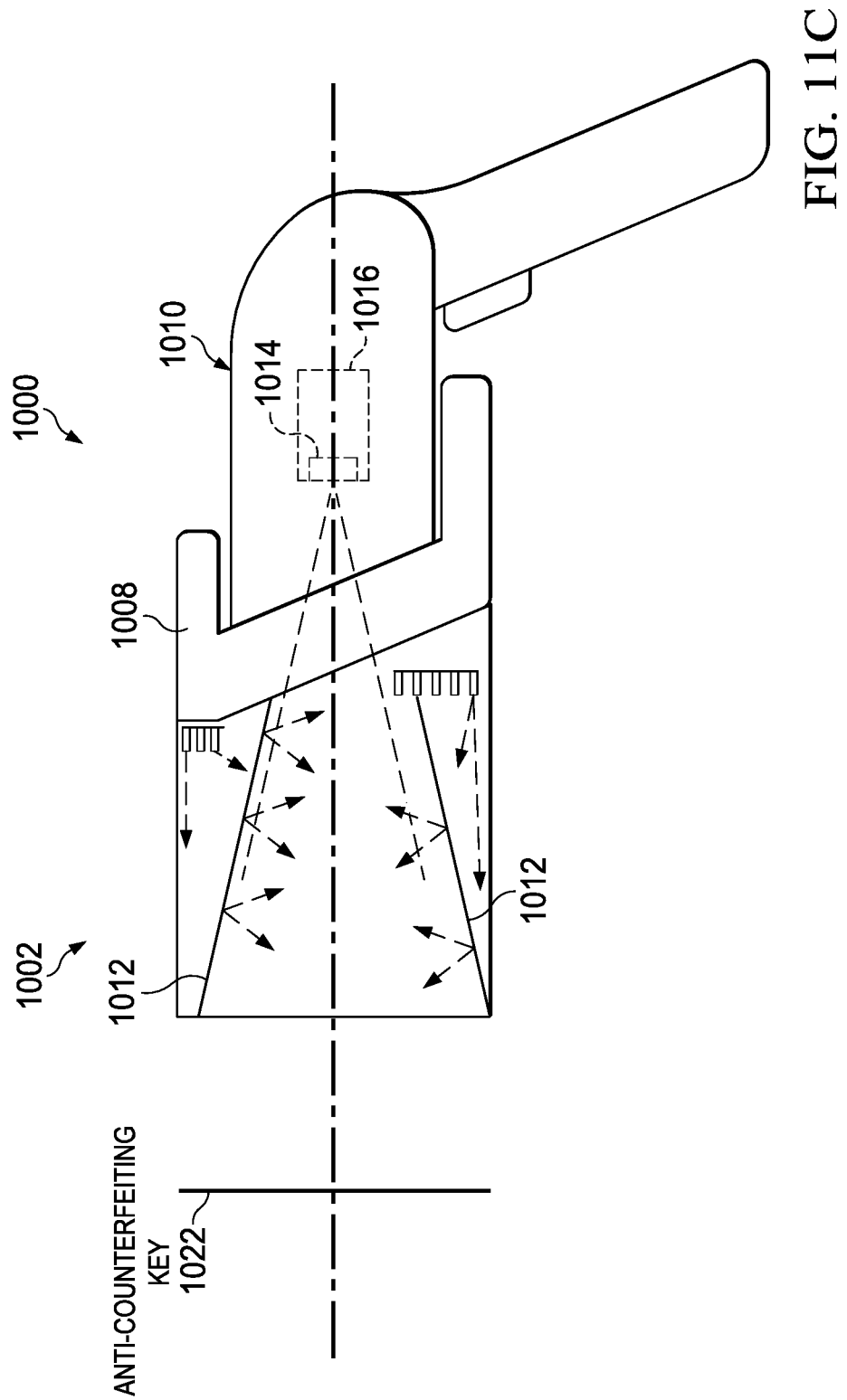

FIGS. 11A-11C are schematic view illustrations of the assembly 1000 and kit 1002 of FIGS. 10A and 10B that successively create a uniform distribution of red, green, and blue light sources that are reflected from the anti-counterfeiting key 1022 to a camera 1016 of the barcode reader 1010. In an embodiment, the visible illumination sources 1004a and 1004b include red, green and blue sources that correspond to red, green and blue lighting conditions. A uniform distribution of the light may be used in order to avoid any "hot spot" effect that may blind the camera 1016 that may cause an unbalanced color detection process. FIG. 11A-11C show three steps for illuminating the anti-counterfeiting key 1022 by successively turning on red, green, and blue illumination devices that are diffused via the diffuser 1012.

Color information may be obtained by acquiring with the camera 1016, which is generally black and white, of the reader 1010 in sequence red, green, and blue images. These three images, if centered and merged, may be used to create a colored image, as understood in the art.

Invisible Source

With regard to FIG. 12, a schematic view illustration of the assembly 1000 and kit 1002 of FIGS. 10A and 10B that illustrates illumination of the invisible sources 1004c (e.g., IR and UV) to activate luminescent inks of an embodiment of an anti-counterfeiting key 1202 is shown. The invisible illumination sources 1004c are shown to be positioned within the diffuser 1012 so as to directly image the anti-counterfeiting key 1202 without diffusion via the exit window 1020 that is within the field-of-view 1018 of the optical sensor 1014 of the camera 1016. The purpose of the invisible light may be used to initiate a reaction of the ink of the anti-counterfeiting key 1202, as opposed to creating a color map.

Magnifying System

With regard to FIG. 13, an illustration of an illustrative embodiment of the "basic package" barcode reader and stand assembly 1000 of FIGS. 10A and 10B along with an imaging kit 1300 that includes magnifying optics 1302 is shown. The magnifying optics 1302 may be used to transform the barcode reader 1010 into a microscope along with light source(s) 1304a and 1304b (collectively 1304) positioned behind an exit window 1306. The exit window 1306 may be connected between side walls 1308 of the kit 1300. The light sources 1304 may be used to illuminate an anti-counterfeiting key 1310. By using the magnifying optics 1302 in front of the barcode reader 1010, the camera 1016 may be able to more precisely read details of an anti-counterfeiting key that would otherwise not be possible, thereby providing for a higher level of anti-counterfeiting security. The light sources 1304 of the kit 1300 may be turned on separately to support anti-counterfeiting optical technology that supports magnification of the reader image and also color detection (e.g., through sequentially turning on red, green, and blue illumination sources). It should be understood that if no color image is used for the anti-counterfeiting process, then the sources may be turned on simultaneously to create a white illumination.

Field of View Splitter

With regard to FIG. 14, an illustration of an illustrative embodiment in which another alternatively imaging kit 1400 is configured to attach to a "basic package" barcode reader and stand assembly 1000 of FIGS. 10A and 10B is shown. The kit 1400 may include a beam splitter 1402, aspherical bending mirrors 1404a and 1404b (collectively 1404), and light source(s) 1406 used for imaging an anti-counterfeiting key by the barcode reader 1010. The kit 1400 provides for the ability to (i) create two different views from different perspectives of the same portion of a field-of-view 1408, and (ii) use directional sources. The beam splitter or splitting mirror 1402 may be configured to separate the field-of-view 1408 of the reader camera 1016 in two portions that may be equally dimensioned. The beam splitter 1402 may be formed by two flat surfaces. Alternatively, aspherical surfaces may be utilized to form the beam splitter 1402.

In operation, the two aspherical bending mirrors 1404 may deviate the field-of-view 1408 toward an exit window 1410. Because of the aspherical surface of the bending mirrors 1404, a magnification of an image sensor 1014 of the reader camera 1016 may be created so as to frame only a portion of the window being used to image an anti-counterfeiting key. The light source(s) 1406, which may include red, green, and blue LEDs, may be turned on each of the colors (i) sequentially if color images are to be captured or (ii) simultaneously if black and white image are to be captured. The light source(s) 1406 may be directional in order to highlight holograms that may be seen only by a specific combination among source direction and optical axis of the system. As shown in FIG. 14, the two optical paths are unbalanced in order to frame the exit window 1410 with directions tilted in a non-symmetric way, thereby creating two different combinations of light direction-optical axes. The various illumination and optical imaging techniques of the anti-counterfeiting keys support a variety of anti-counterfeiting keys to be used for different objects over a wide range of economic value. And, by enabling different kits to be attached to a "basic package" barcode reader and stand assembly, a user may have the ability to select from a range of different anti-counterfeiting technologies using a standard barcode reader that may be upgraded using software, as previously described.

Coherent Light Source and Hologram

In addition to RGB, UV, and IR sources, a coherent laser source may be utilized when a standard hologram is to be illuminated and a generated image is recorded on the image sensor. In an embodiment, the use of a coherent light source to illuminate a hologram may not include the use of a diffuser sheet. Such a hologram is a different, but known, type of anti-counterfeiting key, and functions different from the anti-counterfeiting key and reader that detects diffraction peaks on the diffuser sheet.

Anti-Counterfeiting Keys

The use of an anti-counterfeiting key provides for a number of features that are utilizable on a wide range of products, including (i) low rate of production with high value and (ii) high rate of production with low value. The anti-counterfeiting system described hereinabove provides for a single standard that supports a wide variety of an anti-counterfeiting keys usable for a wide range of product types. The anti-counterfeiting keys may include a code that is unique for any single product and mathematically linked to a standard code, such as a UPC code, contained in a machine-readable indicia, such as a barcode. The mathematical relationship between the standard code and anti-counterfeiting code may be known only from a manufacturer and may be contained in decoding software of a barcode reader. The decoding feature of the software in the barcode reader is inaccessible to the common customer and a product counterfeiter. Implementation of the anti-counterfeiting key is to have both high flexibility in terms of tooling cost and unit cost of a single key in such way that the barcode reading system offers the possibility of creating an efficient anti-counterfeiting system for all types of products In an embodiment, the anti-counterfeiting key may include one or more reflective diffractive gratings that satisfy the various technology criteria desired for use with different product types. An anti-counterfeiting key that is based on reflective diffractive grating(s) may be read by a common barcode reader that includes a coherent source and a sheet of diffusive material, as previously described. That is, a reader with a coherent source and diffusive sheet may be used to read both standard barcodes and anti-counterfeiting keys with diffractive grating(s). The use of diffractive gratings with features that are nanometrically controlled provide for an evolving technology that enables a durable condition few select companies that have tooling and processes to build diffractive gratings with features of particular sizes and shapes that are difficult to reproduce by a potential counterfeiter.

The anti-counterfeiting key provides for considerable flexibility in term of tooling and single product costs. The anti-counterfeiting key may be manufactured using (i) flat-embossing on polymeric materials for high cost tooling and low cost single product or (ii) a master replica made through engraving on glass for lower tooling cost, but with high costs of the single key and longer time to manufacture. Combinations of more keys with different features size and shape provides for the possibility to create keys containing a unique code for each product.

Anti-Counterfeiting Key Technical Details

Figure 15A:
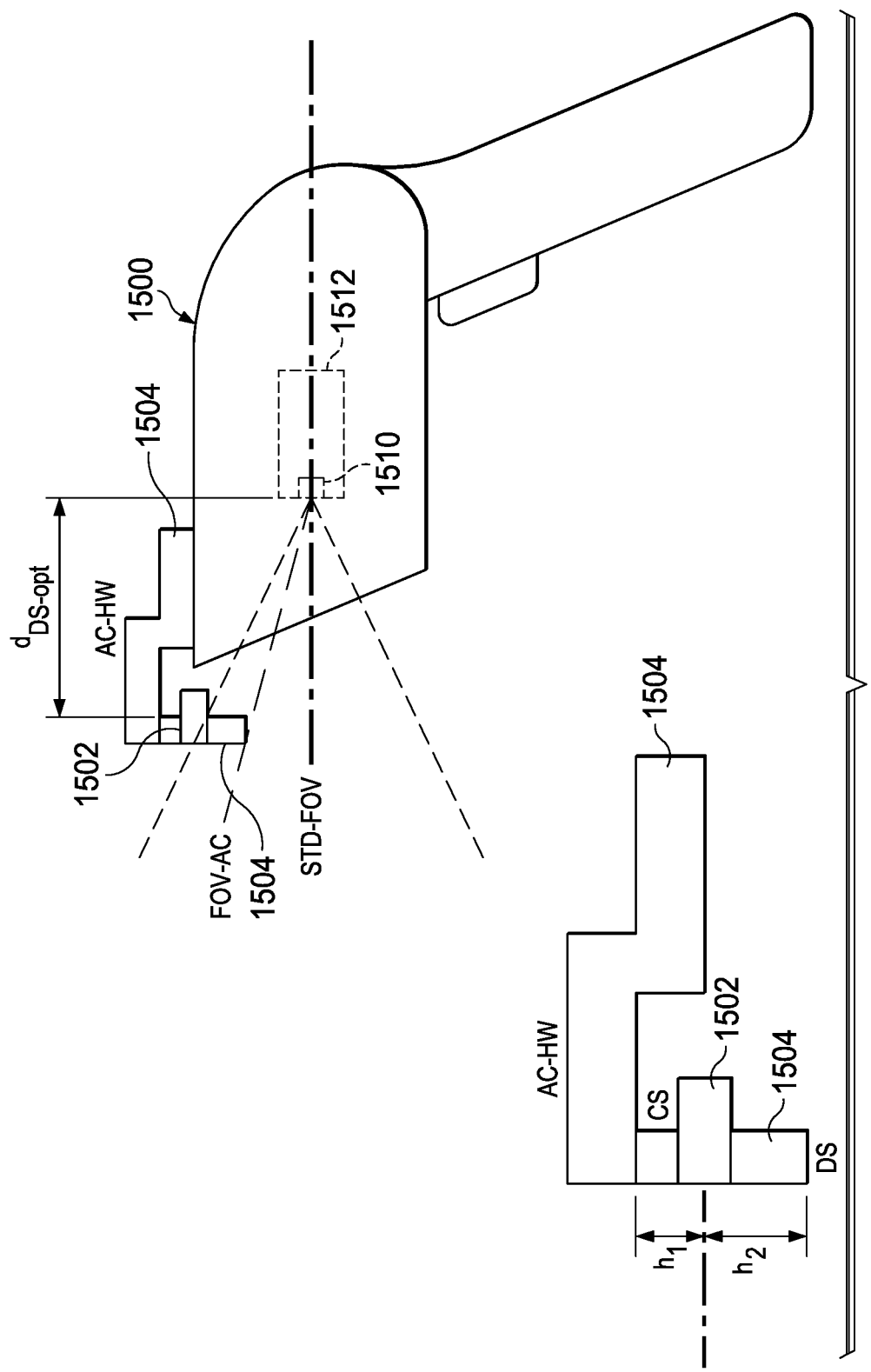
FIGS. 15A and 15B are illustrations of an illustrative standard barcode reader with an anti-counterfeiting kit attached to a mechanical interface enables the barcode reader to read a machine-readable indicia along with an anti-counterfeiting key.
Figure 15B:
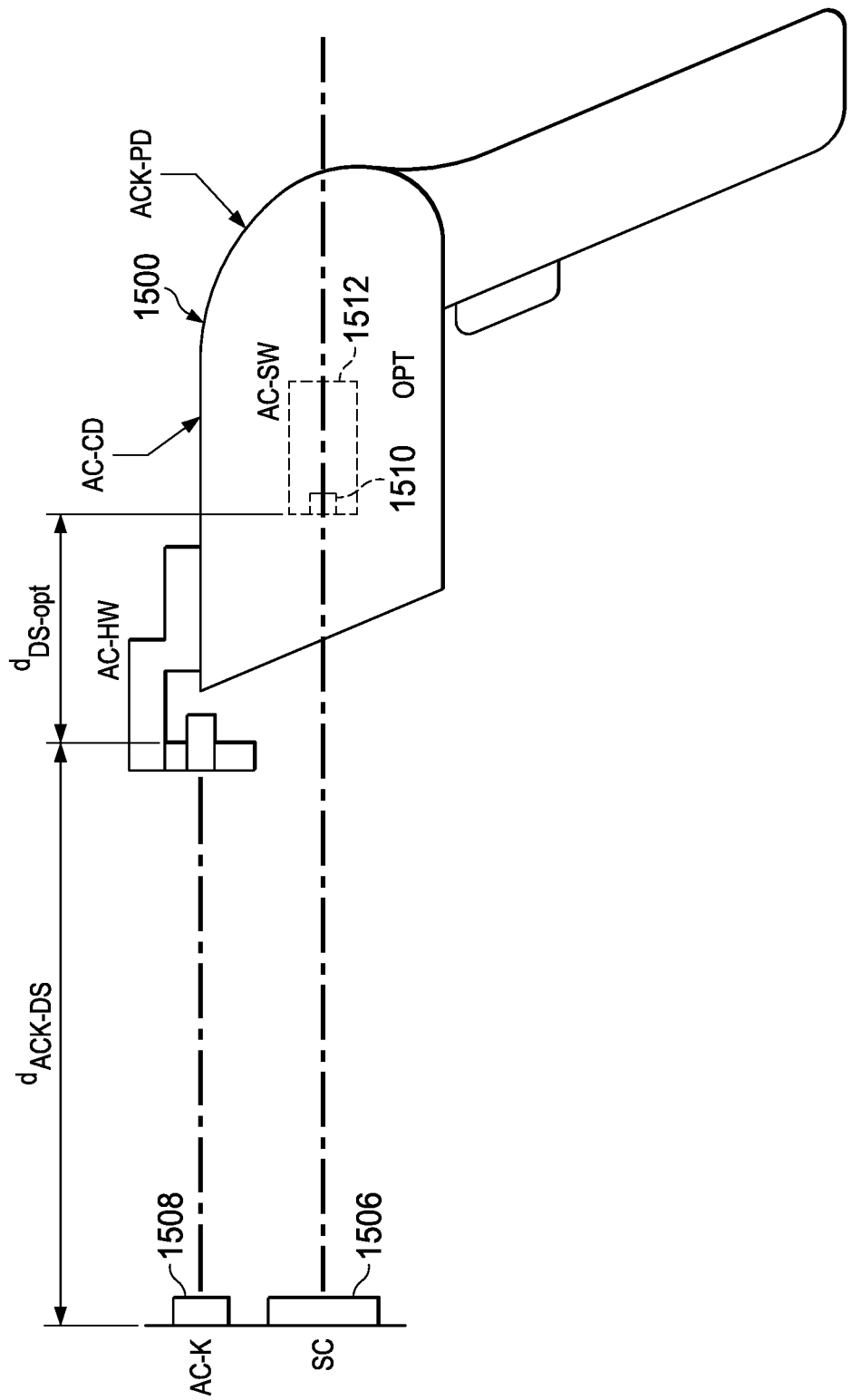

With regard to FIGS. 15A and 15B, illustrations of an illustrative standard barcode reader 1500 with an anti-counterfeiting kit 1502 attached to a mechanical interface 1504 enables the barcode reader 1500 to read a machine-readable indicia 1506 along with an anti-counterfeiting key 1508 are shown. A number of alignment angles and distance measurements are depicted. The following abbreviations describe components and relationships shown in the figures:

TABLE I

Abbreviations of Parts and Parameters

| Abbreviation | Name |
|---|---|
| ACK | anti-counterfeiting key |
| AC-C | anti-counterfeiting key code |
| AC-CD | anti-counterfeiting calibration data |
| AC-HW | anti-counterfeiting hardware |
| AC-PD | anti-counterfeiting protection data |
| AC-SW | anti-counterfeiting software |
| CS | coherent source |
| DS | diffusive sheet |
| FOV-AC and FOV-SC (STD-FOV) | respectively field-of-view of the receiving optical system (OPT) dedicatee to anti-counterfeiting key readings and field-of-view of OPT dedicated to the readings of the standard code (SC) |
| OPT | receiving optical system provided by the standard barcode reader |
| SC | standard code (machine-readable indicia) |

In the embodiment as shown, the barcode reader 1500 is configured to perform an anti-counterfeiting key verification. The anti-counterfeiting key 1508 may be composed of three diffractive gratings having substantially square shapes that are vertically aligned along an axis of an object, and positioned in the upper-right corner of a standard code (see FIG. 16). The sizes of the diffractive gratings may be of a few millimeters, which is much smaller than standard barcode sizes. It should be understood that shapes, alignments, and orientations may be altered and still provide for the same or similar functionality as described herein.

The type of grating and material that forms the anti-counterfeiting key 1508 may be chosen accordingly to the type of product that has to be protected. In FIG. 15A, the anti-counterfeiting additional hardware (AC-HW) for the barcode reader 1500 is shown to include the coherent source 1502 and diffusive sheet 1504.

The coherent source (CS) 1502 is generally constituted by a laser diode that may further include appropriate optics to increase coherence degree of the coherent source 1502. The coherent source 1502 is used to illuminate the anti-counterfeiting key 1508 that, in the case of including a diffractive grating, causes a diffractive pattern to be generated.

A diffusive sheet (DS) 1504 may be formed of a material with a high degree of diffusivity degree and high transmissivity. The diffusive sheet 1504 may be used to create an image of the pattern diffracted by the anti-counterfeiting key 1508, so that the image of the diffractive pattern can be observed by an image sensor 1510 of a camera 1512.

As shown, the coherent source 1502 may be disposed along the diffusive sheet 1502. In an embodiment, the coherent source 1502 may be disposed $h_1$ below a top of the diffusive sheet 1504 with a height $h_2$ of the diffusive sheet 1504 extending below the coherent source 1502, where the heights $h_1$ and $h_2$ are based on a center of the coherent source 1502. In addition, a distance $d_{DS\text{-}OPT}$ from the diffusive sheet to the image sensor 1510 may be established, as shown. Furthermore, a parameter for distance $d_{ACK\text{-}DS}$ that defines a distance from the anti-counterfeiting key to a back side of the diffusive sheet may be used. These distance parameters may be used in performing a verification that the anti-counterfeiting key is correct based on sizing of an anti-counterfeiting pattern imaged on the image sensor 1510.

Anti-Counterfeiting Protection Data (AC-PD)

The anti-counterfeiting key may contain the anti-counterfeiting protection data used for identification of anti-counterfeiting key validity. In identifying the anti-counterfeiting key validity, a process for performing anti-counterfeiting key code extraction and determining a mathematical relationship between the anti-counterfeiting key and standard codes may be performed by anti-counterfeiting software executed by a processor of the barcode reader 1500 or other processor operating independent of the reader 1500. The decoding software may be downloaded into the barcode reader 1500, and may be configured to perform the process of:

1. checking validity of anti-counterfeiting key extraction conditions, such as distance of the reader 1500 from the key 1508 and centering of the reader 1500 relative to the key 1508;

2. extracting data of the key 1508, such as size and shape of grating features;

3. checking size and shape of features of the anti-counterfeiting key 1508 by comparing the measured size and shape values with expected ones contained in anti-counterfeiting protection data stored in the reader 1500; and 4. extracting code contained in the anti-counterfeiting key 1508 along with verification of a mathematical relationship between the codes of the anti-counterfeiting key 1508 and machine-readable indicia.

Anti-Counterfeiting Calibration Data (AC-CD)

The anti-counterfeiting calibration data may be a data set that contains some additional system features, such as coherent source position and inclination with respect to an optical axis of a receiving optical system (e.g., image sensor), transmission properties of a diffusive sheet, and so on.

Reading Sequence

A sequence of operations that may be used in order to recognize a non-counterfeit product may including the following steps:

1. reading the standard code;
2. verifying validity of the anti-counterfeiting key;
3. reading a code contained in the anti-counterfeiting key; and
4. verifying a mathematical relationship between codes of the anti-counterfeiting key and machine-readable indicia.

The reading of a standard code of a machine-readable indicia may be performed as currently understood in the art by a barcode reader. Verification of validity of the anti-counterfeiting key may be performed by validating if sizes ($\Delta_{feature}$) and shapes ($\Phi_{feature}$) of grating features are within a certain tolerance range.

In an embodiment, in response to verifying the mathematical relationship between codes of the anti-counterfeiting key and machine-readable indicia, a message may be generated. The message may be an audible signal (e.g., tone) and/or illumination of a visual indicator (e.g., green). Alternatively, the message may include a data message to a point-of-sale (POS) or otherwise. Similarly, if the mathematical relationship is not verified, which indicates that an associated item is counterfeit, a different message may be generated (e.g., different audible signal and/or illumination of a visual indicator (e.g., red)).

Figure 16:
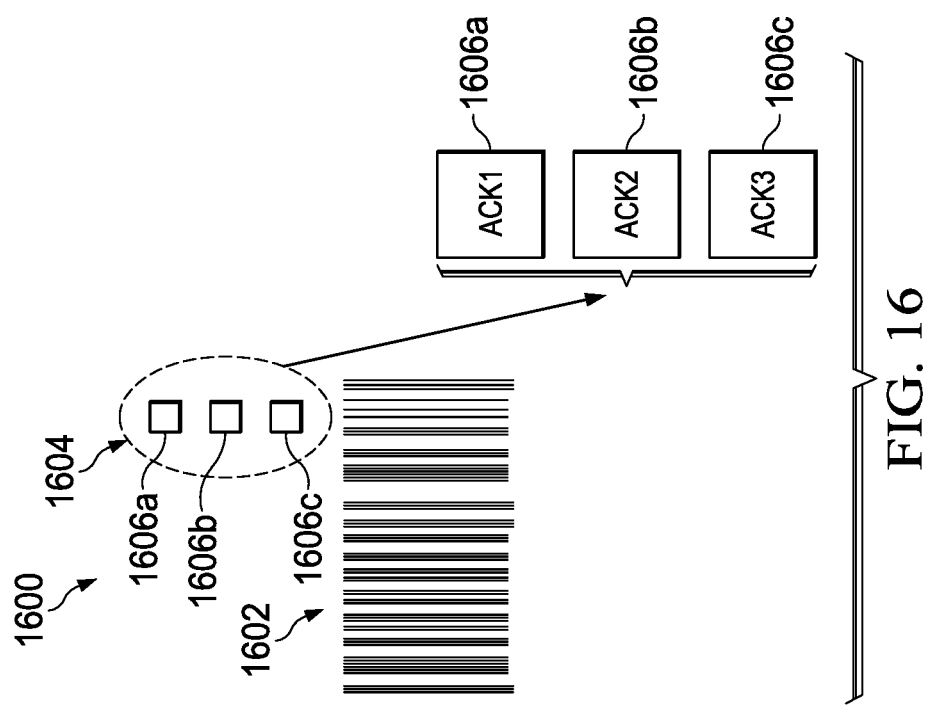
FIG. 16 is an illustration of an illustrative machine-readable indicia or standard code proximately located with an anti-counterfeiting key composed of three diffractive gratings.

With regard to FIG. 16, an illustration of an illustrative machine-readable indicia or standard code 1602 proximately located with an anti-counterfeiting key 1604 composed of three diffractive gratings 1606a-1606c is shown. It should be understood that the machine-readable indicia 1602 may be any other type of code of any dimension (e.g., 1D or 2D) that is machine readable, such as a QR code. In addition, the anti-counterfeiting key 1604 may be composed of one or more diffractive gratings depending on a level of security desired by a manufacturer.

Figure 17:
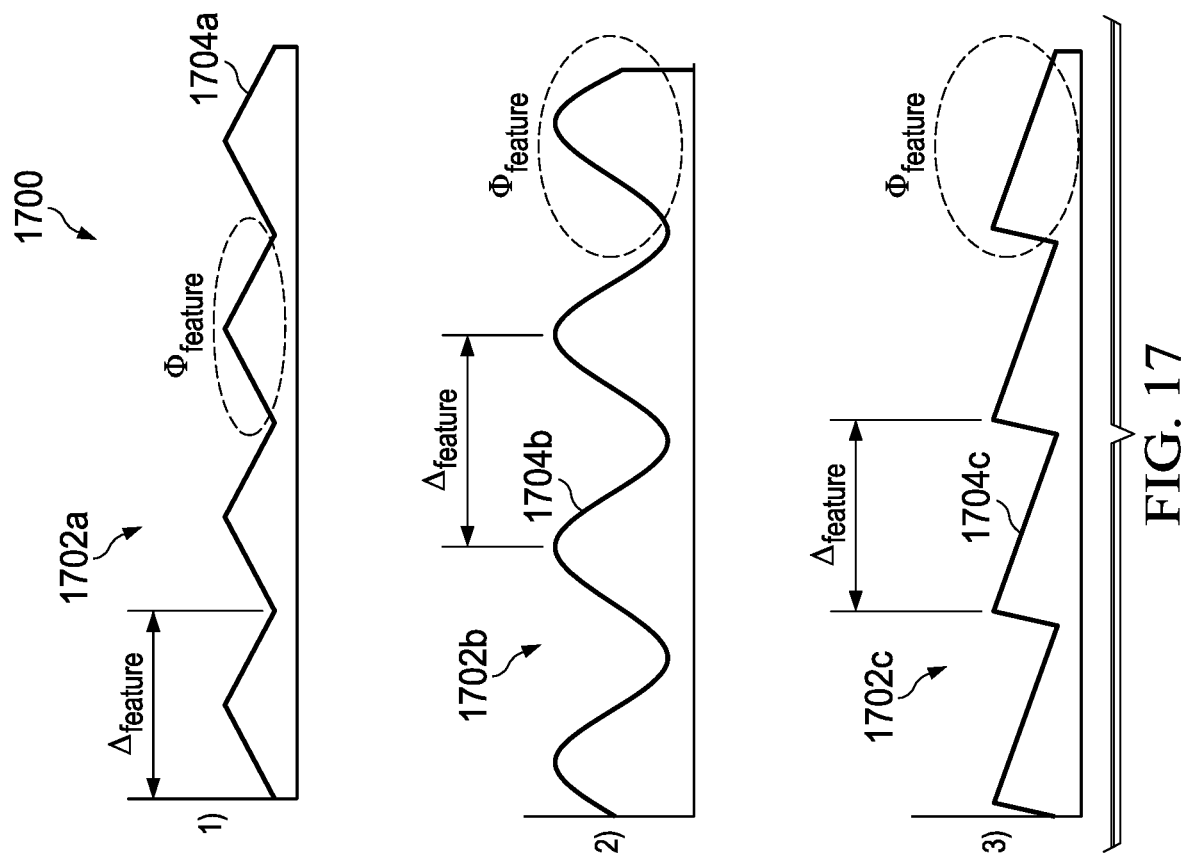
FIG. 17 is an illustration of a set of three different diffractive gratings that may be used to provide an anti-counterfeiting key, such as the anti-counterfeiting key of FIG. 16.

With regard to FIG. 17, an illustration of a set 1700 of three different diffractive gratings 1702a, 1702b, and 1702c (collectively 1702) that may be used to provide an anti-counterfeiting key, such as the anti-counterfeiting key 1604 of FIG. 16. In an embodiment, the diffractive gratings 1702 may have different profiles that are defined by sizes ($\Delta_{feature}$) and shapes ($\Phi_{feature}$) on their respective top surfaces 1704a, 1704b, and 17804c. As shown, diffractive grating 1702a has a triangular profile, diffractive grating 1702b has a sinusoidal profile, and diffractive grating 1702c has a sawtooth profile. As understood in the art, diffractive gratings of different profiles cause different diffractive patterns to be reflected from an illumination source. As previously described, the different profiles may be used for validation of the anti-counterfeiting key by determining if sizes ($\Delta_{feature}$) and shapes ($\Phi_{feature}$) of grating features are within a certain tolerance range. It should be understood that the profiles of the diffractive gratings 1702 are illustrative and that any additional and/or alternative grating profile may be utilized to form an anti-counterfeiting key. To ensure that anti-counterfeiting keys of different products are unique, diffractive gratings having different profiles are to be utilized across different products and/or manufacturers.

With regard to FIG. 18, an illustration of an illustrative diffractive grating assembly 1800 with a diffractive grating 1802 disposed on a substrate 1804 that reflects an incident illumination source into diffractive orders is shown. An incident illumination source or beam (I) that reflects from the diffractive grating 1802 is diffracted into different spectral orders, as understood in the art.

Parameter $\Delta_{feature}$ may be verified through indirect measurement of propagation angles of the first two orders of diffractive using the following formula:

$$G*m*\lambda = \sin(\alpha) + \sin(\beta_m),$$

where $G=1/\Delta_{feature}$, and m is the diffractive order.

The diffractive orders propagating angles may be obtained through the measurement of two parameters as a distance from the anti-counterfeiting key to the reader ($d_{ACK-DS}$+ $d_{DS-OPT}$, see FIGS. 15A and 15B) and the distance between the different diffractive orders ($\Delta x_{m-n}$, where m and n are two different diffractive orders (see FIG. 19)).

Figure 21:
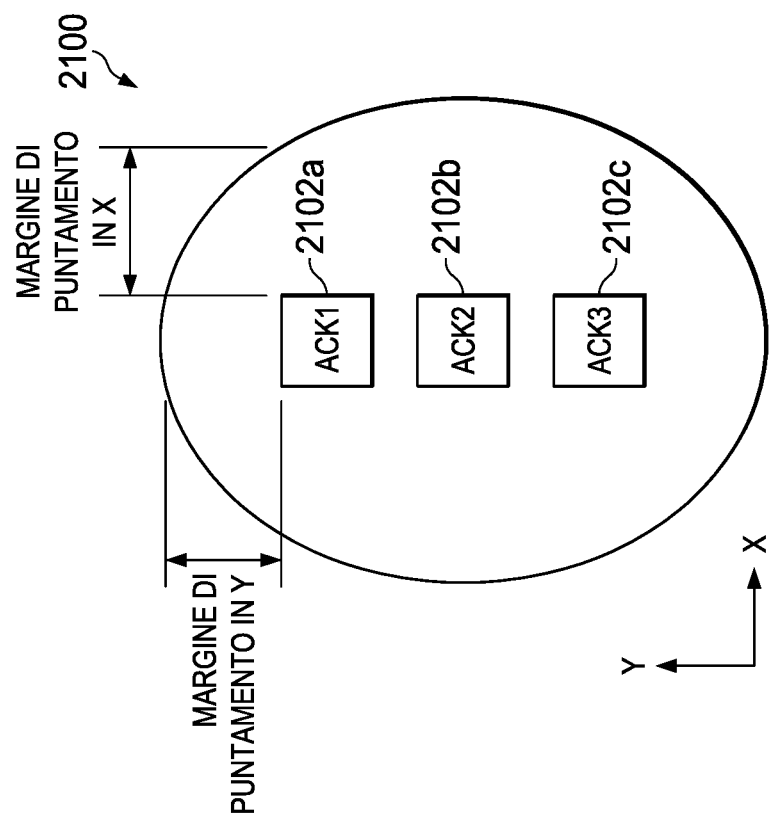
FIG. 21 is an illustration of an illustrative set of diffractive gratings that define an anti-counterfeiting key.
Figure 20:
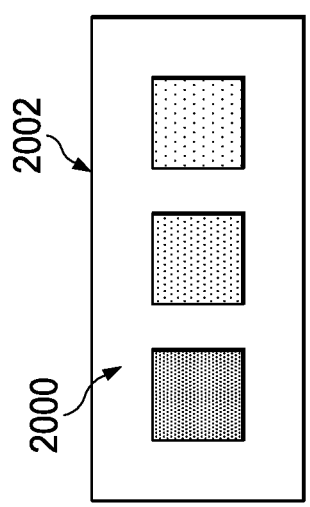
FIG. 20 is another illustration of an illustrative set of diffractive spots produced by different diffractive orders.

With regard to FIG. 19, an illustration of an illustrative set of spots 1900 including spot 1902a, 1902b, and 1902c having respective illumination intensities $I_1$, $I_2$, and $I_3$ that defines a diffractive pattern as reflected from a diffractive grating of an anti-counterfeiting key is shown. The spots 1902a, 1902b, and 1902c are the order 0, order+1, and order+2, respectively, which is why intensity of the spots decrease from order 0 to order+2. The distance $d_{ACK-DS}$+ $d_{DS-OPT}$ may be obtained using the pattern projected by the coherent source and detected by an image sensor and camera (OPT). The anti-counterfeiting software may use (i) the image of the spots 1902a, 1902b, and 1902c having intensities $I_0$, $I_1$, and $I_2$ (see also FIG. 20 showing spots 2000 produced by different diffractive orders and imaged on a sensor 2002) reflected by the anti-counterfeiting key of the coherent source as a function of magnification parameters of the optical system contained in anti-counterfeiting calibration data estimates, (ii) the distance, and (iii) the position, with some approximation due to the size of the beam of the coherent source incident on the anti-counterfeiting key, as shown in FIG. 21, on the x-y plane of the anti-counterfeiting key 2100 that includes multiple diffractive gratings 2102a, 2102b, and 2102c. If the estimated distance $d_{ACK-DS}$ is approximately inside a range of acceptable distance $d_{ACK-DS}$ values contained in anti-counterfeiting protection data (AC-PD), the anti-counterfeiting protection software may continue verification of the anti-counterfeiting key.

A distance between the different diffractive orders may be calculated by estimating the positions of the different orders projected on the diffusive sheet and imaged onto the image sensor. The position may be calculated by reading the different orders of diffractive of a diffractive pattern projected on the image sensor of the reader camera from the diffusive sheet. Once the image is obtained, the position of the diffractive orders on the diffusive sheet may be obtained by calculating a weighted average of pixels of the orders on the diffractive image on the image sensor. The weighted average may be used because the diffusive sheet (DS) is generally near the reader camera, which may cause the image to be slightly blurry. It is noted that barcode readers generally have a focal plane at a distance on the order of 120 mm. Other focal plane distances may alternatively be utilized.

Figure 22:
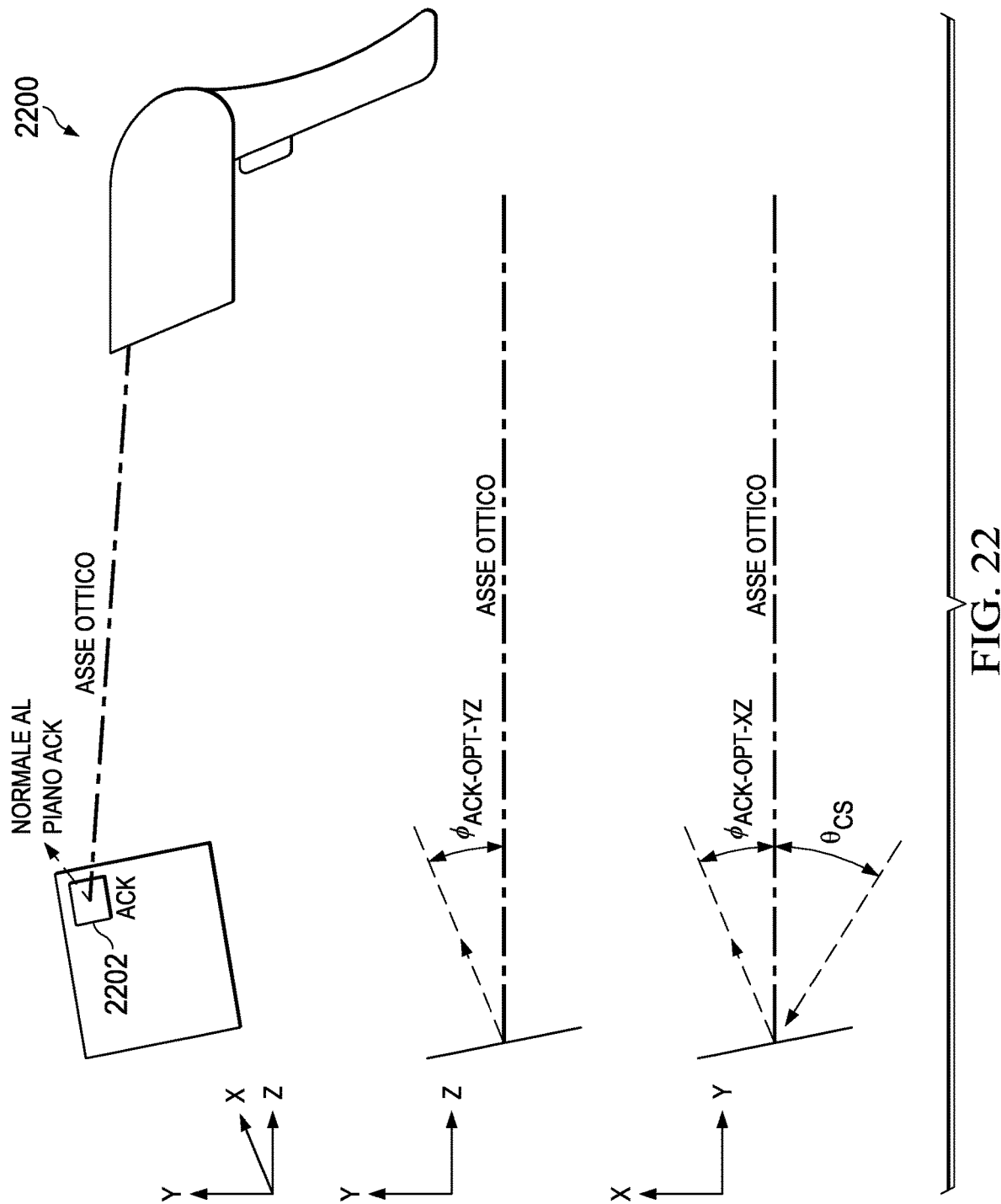
FIG. 22 is an illustration of an illustrative barcode reader position at a distance relative to an anti-counterfeiting key showing relative planar coordinate axes.

With regard to FIG. 22, an illustration of an illustrative barcode reader 2200 positioned at a distance relative to an anti-counterfeiting key 2202 showing relative planar coordinate axes is shown. Once obtained, the position of the grating on the x-y plane (see FIG. 22) and a distance from the reader, inclination of the normal to the plane of the anti-counterfeiting key with respect to the OPT optical axis may be calculated (see FIG. 22) In particular, the values of $\emptyset_{ACK-OPT-yz}$ (i.e., inclination of the normal to the anti-counterfeiting key plane with respect to the image sensor of the camera (OPT) optical axis in the plane y-z) and $O_{ACK-OPT-xz}$ (i.e., the inclination of the normal to the anti-counterfeiting key plane with respect to the image sensor of the camera (OPT) optical axis in the x-z plane) may be calculated.

Using the coherent source position with respect to the image sensor of the reader camera (OPT) and diffusive sheet (DS) (contained in anti-counterfeiting calibration data (AC-CD)), at the known position of the anti-counterfeiting key in the x-y plane and to $d_{ACK\text{-}DS}$ (estimated), it is possible to calculate $\theta_{CS}$ that is the coherent source inclination with respect to the optical axis of the image sensor of the reader camera.

Using a well-known formula of a diffractive grating (see FIG. 18) $G*m*\lambda=\sin(\theta_{source})+\sin(\theta_{order}\ m)$, where the angle $\theta_{source}$ is the inclination of the source with respect to the anti-counterfeiting key plane, in this case is $\theta_{source}=\theta_{CS}+\varnothing_{ACK\text{-}OPT\text{-}xz}$), $G=1/\Delta_{feature}$ are the grating feature density and m is the diffractive order in question.

The diffractive order propagating angles may be determined using the formulas:

$$\theta_{order0}=x_{order0}*\cos(\varnothing_{ACK})/(1_{ACK\text{-}BR}+\text{xorder0}*\sin(\varnothing_{ACK}))$$

$$\theta_{order1}=x_{order1}*\cos(\varnothing_{ACK})/(1_{ACK\text{-}BR}+\text{xorder1}*\sin(\varnothing_{ACK}))$$

$$\theta_{order2}=x_{order2}*\cos(\varnothing_{ACK})/(1_{ACK\text{-}BR}+\text{xorder2}*\sin(\varnothing_{ACK}))$$

where $x_{order0}$, $x_{order1}$, and $x_{order2}$ are the positions of the diffractive orders projected to the diffusive screen (DS) estimated through the weighted average of the image pixels.

Using the diffractive angles, and the formula: $\Delta_{feature}=m*\lambda(\sin(\theta_{source})+\sin(\theta_{order}\ m))$, the grating feature sizes are able to be estimated with accuracy.

The intensity of different orders $I_m$ (FIG. 19) is affected by the shape of the feature through complex formulas that depend on the specific feature shape. The formulas may still be contained in anti-counterfeiting protection data (AC-PD). The intensity of the diffractive orders $I_m$ may be detected by the reader camera (OPT), and may be corrected by the anti-counterfeiting software (AC-SW) using the diffusive sheet (DS) transmission coefficients contained in the anti-counterfeiting calibration data (AC-CD).

If the estimation of features size is inside the range of possible values contained in the anti-counterfeiting protection data (AC-PD) and the shape of the features is one of the possible forms contained in the (AC-PD), then the grating is identified as true. Such a feature size verification may be performed for any number of diffractive patterns produced by the anti-counterfeiting key (ACK).

Reading of the Code Contained in the ACK

Figure 23:
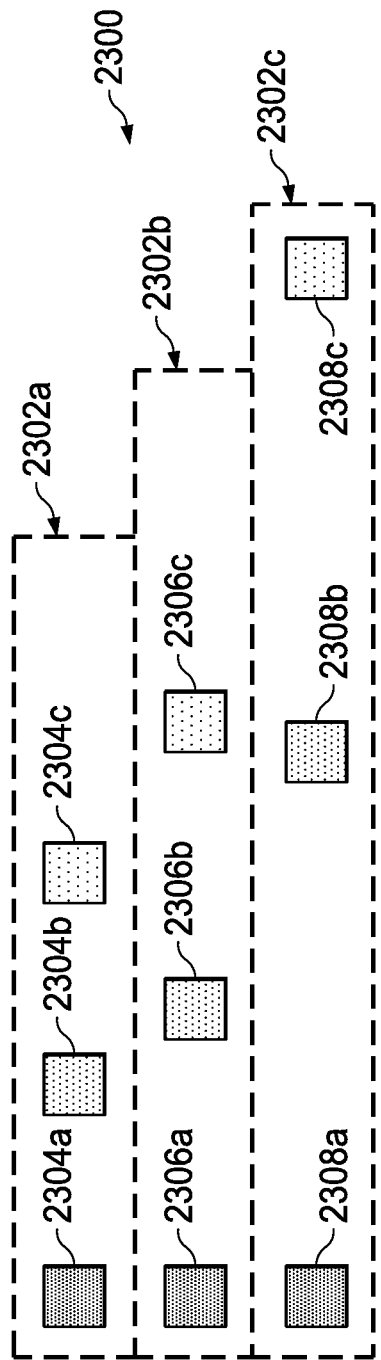
FIG. 23 is an illustration of illustrative sets of reflected diffractions from an anti-counterfeiting key inclusive of three diffractive gratings.

With regard to FIG. 23, an illustration of illustrative sets 2300 of reflected diffraction patterns from an anti-counterfeiting key inclusive of three diffractive gratings is shown. The sets 2300 are shown to include a first diffractive pattern 2302a, second diffractive pattern 2302b, and third diffractive pattern 2302c that are reflected from different diffractive gratings, such as shown in FIG. 21.

Each diffractive pattern 2302a, 2302b, and 2302c includes a set of three spots 2304a-2304c (collectively 2304), 2306a-2306c (collectively 2306), and 2308a-2308c (collectively 2308), respectively, that may be used to validate an anti-counterfeiting key and represent code(s) that may be mathematically related to a standard code of a machine-readable indicia. The mathematical relationship between the anti-counterfeiting key code and standard code may be known to a manufacturer of a product and stored in an inaccessible memory location to a user or manufacturer of the reader.

When the anti-counterfeiting key (ACK) positioned at a proper distance is illuminated by the coherent source, the anti-counterfeiting key reflects diffractive orders to the diffusive sheet, and one or more sets of diffractive patterns result on the diffusive sheet, as shown in FIG. 23. An illustrative structure of a code is revealed by an anti-counterfeiting key, where the code typically includes the order 0 and the first two positive orders of three diffractive gratings, in this case, that form the anti-counterfeiting key. Reading of the code may be performed from top to bottom or vice versa. Because the diffractive gratings of an anti-counterfeiting key may be different from one another, spacing between the spots 2304, 2306, and 2308 of the respective diffractive patterns 2302a, 2302b, and 2302c are shown to be different along the horizontal axis.

Figure 24:
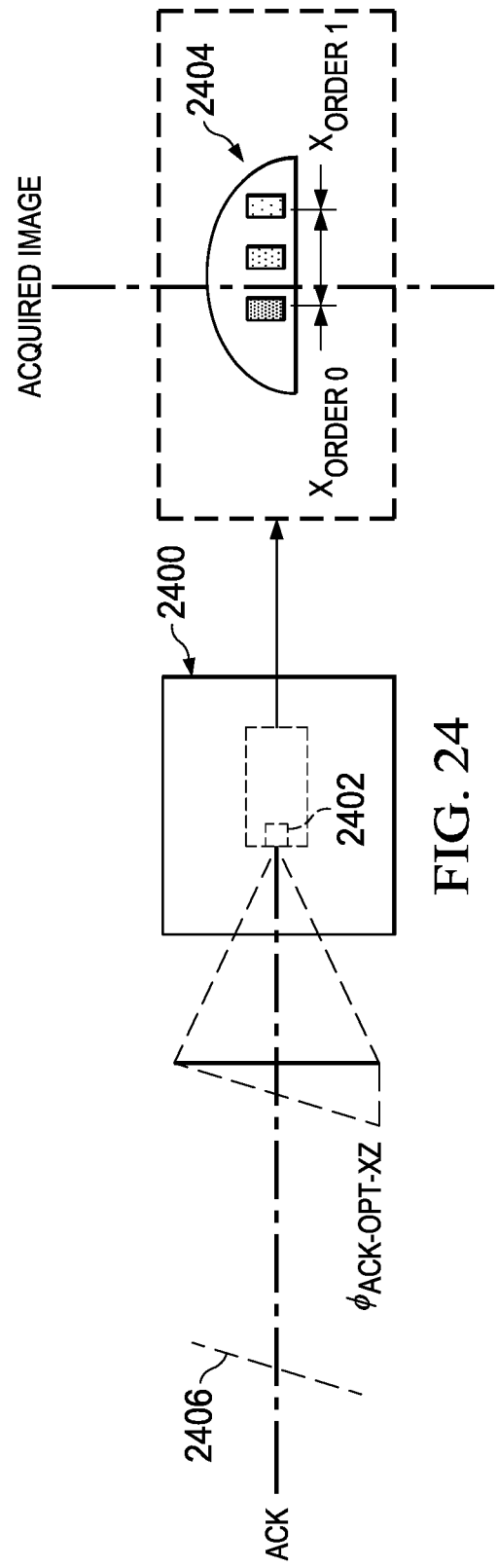
FIG. 24 is an illustration of an illustrative barcode reader inclusive of an image sensor onto which reflected diffractive orders from an anti-counterfeiting key are imaged.

With regard to FIG. 24, an illustration of an illustrative barcode reader 2400 inclusive of an image sensor 2402 onto which spots 2404 reflected diffractive orders from an anti-counterfeiting key 2406 are imaged is shown. A code may be assigned a value based on a value $\Delta x_{0\text{-}2}$ of the different gratings given by the formula: $\Delta x_{0\text{-}2}=(x_{order2}+x_{order0})*\cos(\varnothing_{ACK})$, where $x_{order0}$ and $x_{order2}$ are estimated positions through the pixel weighted average pixel over the diffusive sheet plane (see FIG. 23).

The value of the code (anti-counterfeiting key code (ACK-C)) may be determined by:

$$ACK\text{-}C = \frac{(\Delta x_{0\text{-}2}^1 - \Delta x_{minim})}{\Delta x_{sample}} \cdot \frac{(\Delta x_{0\text{-}2}^2 - \Delta x_{minim})}{\Delta x_{sample}} \cdot \frac{(\Delta x_{0\text{-}2}^3 - \Delta x_{minim})}{\Delta x_{sample}},$$

where $\Delta x_{minim}$ is a value of $\Delta x$ obtainable using a grating with maximum feature sizes inside the range of acceptable values contained in the anti-counterfeiting protection data AC-PD), $\Delta x_{0\text{-}2}^1$ $\Delta x$ is a distance among order 0 and order 2 of grating 1.

In a case where the AC-$K^i$ are provided with only one type of feature shape, the maximum number of possible combinations is given by:

$$ACK\text{-}C_{combinations} = \frac{(\Delta x_{maximum1} - \Delta x_{minim})}{\Delta x_{sample}} \cdot \frac{(\Delta x_{maximum2} - \Delta x_{minim})}{\Delta x_{sample}} \cdot \frac{(\Delta x_{maximum3} - \Delta x_{minim})}{\Delta x_{sample}}$$

where $\Delta x_{maximum}$=a value of $\Delta x$ obtainable using grating with minimum feature sizes inside the range of acceptable values contained in the anti-counterfeiting protection data (AC-PD) and at the same time detectable over the diffusive sheet.

In the event that diffractive gratings may have more than one shape of the features identifiable by the reader, the calculation of the code may be determined by:

$$ACK\text{-}C = $$
$$\frac{(\Delta x_1 - \Delta x_{minim})}{\Delta x_{sample}} \cdot \frac{(\Delta x_2 - \Delta x_{minim})}{\Delta x_{sample}} \cdot \frac{(\Delta x_3 - \Delta x_{minim})}{\Delta x_{sample}} + i \cdot ACK\text{-}C_{combinations}$$

where i=0, 1, 2 . . . , n depending on the predetermined order of the shapes.

Verification of Mathematical Relationship Among ACK and SC Codes

Once the standard code (SC) and anti-counterfeiting key code (ACK-C) are extracted, the mathematical relationship between the two codes may be verified. The relationship between these two codes may be known only from the manufacturer and may be contained in a memory of the reader as anti-counterfeiting protected data (AC-PD) that has limited access to the manufacturer of the product associated with the standard code.

If the information contained in the barcode is static, it is possible to use a particular relationship between the standard code (SC) code plus a check digit and the anti-counterfeiting key (ACK) code. The relation can be regulated by a particular mathematical function, thereby making protection much higher from counterfeiting because the mathematical relation is more complex. In an embodiment, it may be possible to use a random assignment of relationships between a standard code (SC) and anti-counterfeiting key code, and in such a case, part of the barcode reader's memory may contains relations between the codes. In such a case, as soon as an anti-counterfeiting key is counterfeited, then all of the same type of products having the same check digit can be counterfeited.

In contrast, if the information contained in the code is dynamic, protection from counterfeiting is much more effective. In this case, it is possible to have a single standard code (SC) and anti-counterfeiting key code (ACK-C) for any product that is linked through a complex mathematical relationship or, management of the product permitting, using random assignment.

Practical Examples

Products may be manufactured in a large scale, and an example of a setup that may be optimized for products manufactured in large scale is provided hereinbelow. A conventional or standard barcode reader may be considered as a practical example as a conventional barcode reader may be used for reading an anti-counterfeiting key, as previously described.

With regard to FIGS. 25A and 25B, illustrations of illustrative sets of reflected diffractive orders 2500a and 2500b from respective anti-counterfeiting keys imaged onto an image sensor and physical alignment thereof are shown.

In an embodiment, an optimal position of the diffusive sheet may be 32 mm away from a nose of the barcode reader. For example, if the reader camera has a field-of-view of 42.4° the part of the diffusive sheet framed by the reader camera is a portion of an ellipse having respective 24 mm and 16.5 mm radii.

Using the above illustrative parameters, an estimate position of the diffusive sheet with an uncertainty of 2 pixels (weighted average) results in a 0.1 mm of uncertainty on the diffusive sheet (DS) plane. In the case of a grating being manufactured using flat embossing over polymeric materials, the magnitude of features may be on the order of a few microns. In this case, a coherent source (CS) positioned approximately 30 mm away from an optical axis of the barcode reader and including a laser diode with a wavelength of 625 nm (red) may result in an optimal working distance of 48 mm being determined, with the distance being determined by DS-ACK, where the anti-counterfeiting key (ACK) may be detected.

With this working distance, the maximum acceptable $\Delta_{feature}$, where the $\Delta_{feature}$ corresponds to order 1 at a distance of 1 mm away from order 0 above the diffusive sheet (DS), is 6.3 µm. Under these conditions, order 0=−7.3 mm; order 1=−6.4 mm and order 2=−1.4 mm. The minimum feature size when the order 2 is respectively at a distance of 7.3-9.3-11 mm over the diffusive sheet (DS) depending on grating 1, 2, or 3, and the maximum $\Delta_{feature}$ respectively corresponds to 2.7, 3, and 3.3 µm.

Considering that the maximum detectable size over the diffusion sheet (DS) are respectively 9.5-11.5-13.25 mm, an acceptable tolerance of the anti-counterfeiting key (ACK) angle with respect to the diffusion sheet (DS) plane may be calculated as ±2°. The tolerance for inclinations along the horizontal axis is also ±2°, where the lower case is from 13.7 to 16.2 mm, and the upper case is from 19.2 to 21.7 mm.

The number of possible combinations may be calculated by a maximum acceptable difference between the orders 0 and 2 projected over the diffusive sheet (DS) (respectively 9.5-11.5-13.25 mm) and the minimum acceptable difference (in such case 5.9 mm) to the extreme of two-dimensional features divided the minimum recognizable difference in a diffusive sheet (DS) object plane (0.1 mm) (see formula for ACK-C above), which in this case provides for ~3,333,000 possible combinations.

For such type of solution, the tooling foreseen manufacturing of 125 different molds, such forms have to have feature sizes ranging from 2.7 to 6.3 µm with steps of 0.03 µm, the shape of the single feature has to be triangular in order to easily distinguish counterfeiting of the grating using holographic manufacturing methods.

Considering, for example, a product manufactured in a limited run of 340 pieces with a single product price that is high. Assuming that the same barcode model and the same configuration of anti-counterfeiting hardware (AC-HW) described in the previous case. For such type of product, the anti-counterfeiting key may be created by a master replica engraved on glass. As in the previous case, the anti-counterfeiting key may be formed of 3 different gratings (ACK$_i$; i=1, 2.3).

Considering that only 340 pieces are to be protected, a limited number of 7 different models of anti-counterfeiting key elements (ACK$_i$) may be produced such that the number of possible combinations within the anti-counterfeiting code correspond to 343 with a possible codes (i.e., $7^3$).

Considering that anti-counterfeiting key elements (ACK$_i$) are now manufactured in more flexible way and considering that anti-counterfeiting key (ACK) has to be produced in limited number of pieces (i.e., 340), it is possible to make different structural choices of an anti-counterfeiting system from the previous case:

With further regard to FIGS. 26A-26C, illustrative machine-readable indicia 2600a, 2600b, and 2600c and anti-counterfeiting key 2602 proximately positioned therewith at times T1, T2, and T3 are shown. The anti-counterfeiting key 2602 includes anti-counterfeiting key elements 2604a, 2604b, and 2604c.

1. Based on a higher quality of an anti-counterfeiting key manufacturing system, it is possible to develop a more complex anti-counterfeiting key design having many more free parameters, such as $\Delta_{feature}$, that is not constant and that projects or reflects a more complex diffractive pattern than the previous case 2. Utilizing the principles described herein, there are fewer stringent parameters as anti-counterfeiting key reading timing (340 pieces and most expensive product means that product can be read a bit more slowly than in the large-scale production product case), in this case, for example, read the three anti-counterfeiting key elements (ACK$_i$) contained in the anti-counterfeiting key one at a time. In this case, the key elements ($ACK_i$) are spaced such that the beam of coherent source light impinges one anti-counterfeiting key element ($ACK_i$) at respective times T1-T3.

If a constant $\Delta_{feature}$ is not contained in the anti-counterfeiting elements $ACK_i$, validity of the anti-counterfeiting key (ACK) may be recognized on the basis of a complex projected pattern and the distance between the anti-counterfeiting key and diffusive sheet (d=ACK–DS), the difference between a code and the other one will not be recognized according to the distance between order 0 and order 2, but rather on the basis of specific pattern attributed to the coding contained in the anti-counterfeiting protection data (AC-PD). For such a case, however, there will be not only be the first two orders projected onto the diffusive sheet (DS), but may also include a complex pattern from which the anti-counterfeiting software (AC-SW) is to recognize the unique information relating to the $\Delta_{feature}$ distribution of the features inside the anti-counterfeiting feature elements ($ACK_i$). In this case, the counterfeiting or infringement is not limited to only copying a key equal in terms of shape and size of features, but also includes shape and density distribution of features within the anti-counterfeiting key (ACK), which means a more complicated counterfeiting process would be needed to reproduce the anti-counterfeiting key.

For this particular case, the image of the diffractive pattern obtained from the diffusive sheet (DS) may be de-convolved according to the reader camera (OPT) optical response at a distance where the diffusive sheet is placed. Deconvolving slows down the process of acquisition of images, but at the same time, given that the diffusive sheet DS is located away from an ideal focal conjugate plane of the reading camera (OPT) is used in order to have a proper image quality and recognize more stringent parameters in order to identify validity of the anti-counterfeiting key elements ($ACK_i$).

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A code reader, comprising:
   a code reader portion, including:
      a housing;
      a light source disposed within the housing and configured to illuminate a machine-readable indicia representative of a standard code associated with an item;

a code reader exit window attached to the housing and through which the light source projects the illumination;

an image sensor configured to receive an image of the machine readable indicia;

an anti-counterfeiting key reader portion mechanically interfacing with the housing, and including:

an illumination source supported by and positioned outside of the housing, and configured to illuminate an anti-counterfeiting key that, when illuminated by the illumination source, reflects the illumination from the illumination source to be incident on the image sensor;

a diffusion optical component configured to diffuse the illumination of the illumination source to or from the anti-counterfeiting key to be illuminated onto the image sensor via the exit window; and a processing unit in electrical communication with the image sensor, the processing unit being configured to:

decode the standard code of the machine-readable indicia; and check validity of the reflected illumination from the anti-counterfeiting key including comparing a size and shape of detected features within the reflected illumination against an expected size and shape for features of the anti-counterfeiting key based, at least in part, on analyzing a separate illumination spot detected for the illumination source.

2. The code reader according to claim 1, wherein the diffusion optical component diffuses the illumination produced by the illumination source prior to illuminating the anti-counterfeiting key.

3. The code reader according to claim 2, wherein the anti-counterfeiting module is external from the housing of the code reader.

4. The code reader according to claim 1, wherein the light source and the illumination source are angularly aligned with one another.

5. The code reader according to claim 4, wherein the light source and the illumination source are external from the housing of the code reader.

6. The code reader according to claim 1, wherein the light source and the illumination source are at different wavelengths.

7. The code reader according to claim 6, wherein the light source and the illumination source are both configured to illuminate with visible wavelengths.

8. The code reader according to claim 1, wherein the illumination source is a coherent light source.

9. The code reader according to claim 1, wherein the diffusion optical component is a diffusive sheet configured to diffuse the reflected illumination of the illumination source onto the image sensor.

10. The code reader according to claim 9, further comprising a red window disposed behind the diffusive sheet.

11. The code reader according to claim 9, wherein the diffusive sheet is external of the housing of the code reader.

12. The code reader according to claim 1, wherein the processing unit is further configured to extract data from the reflected illumination, of the illumination source.

13. The code reader according to claim 12, wherein the processing unit is further configured to extract a code represented by the anti-counterfeiting key.

14. The code reader according to claim 13, wherein the processing unit is further configured to mathematically determine whether the code represented by the anti-counterfeiting key is associated with the standard code.

15. The code reader according to claim 1, wherein the anti-counterfeiting key includes a diffractive grating, and wherein the image sensor is further configured to receive the reflected illumination from the diffractive grating so as to be incident on the image sensor with the imaged machine readable indicia, and wherein the processing unit is further configured to read the machine readable indicia and anti-counterfeiting key at substantially the same time and check the validity of the anti-counterfeiting key based on the detected features resulting from the reflected illumination of the diffractive grating.

16. The code reader according to claim 15, wherein the anti-counterfeiting key includes at least three diffractive gratings, and wherein the image sensor is configured to receive distinct images from the at least three diffractive gratings in vertical alignment with one another.

17. The code reader according to claim 1, further comprising a memory configured to store anti-counterfeiting calibration data, the processing unit configured to compare the illumination from the illumination source from the image sensor with the anti-counterfeiting calibration data and to perform a validity check.

18. The code reader according to claim 1, wherein the processing unit is further configured to independently decode the standard code and to check validity of the reflected illumination from the anti-counterfeiting key.

19. The code reader according to claim 1, wherein the anti-counterfeiting key reader portion includes an adapter that is mounted to the housing of the code reader portion.

20. The code reader according to claim 1, wherein the anti-counterfeiting key reader portion includes an exit window through which the illumination of the light source and illumination of the illumination source pass.

21. The code reader according to claim 1, wherein the diffusion optical component causes the $0^{th}$, $1^{st}$, and $2^{nd}$ orders of the reflected illumination from the anti-counterfeiting key to be illuminated onto the image sensor.

22. The code reader according to claim 21, wherein the anti-counterfeiting key includes three distinct diffraction gratings vertically or horizontally aligned with one another, and wherein the reflected illumination results in nine reflections being illuminated onto the image sensor.

23. A code reader, comprising:

a code reader portion, including:

a housing;

a light source disposed within the housing and configured to illuminate a machine-readable indicia representative of a standard code associated with an item;

a code reader exit window attached to the housing and through which the light source projects the illumination;

an image sensor configured to receive an image of the machine readable indicia;

an anti-counterfeiting key reader portion mechanically interfacing with the housing, and including:

an illumination source supported by and positioned outside of the housing, and configured to illuminate an anti-counterfeiting key including one or more diffractive gratings that, when illuminated by the illumination source, generate a diffractive pattern in the reflected illumination; and a diffusion optical component configured to diffuse the illumination of the illumination source to or from the anti-counterfeiting key via the exit window to be illuminated onto the image sensor;

a processing unit in electrical communication with the image sensor, the processing unit being configured to:

decode the standard code of the machine-readable indicia; and check validity of the anti-counterfeiting key based, at least in part, detecting a valid pattern for the diffractive pattern in the reflected illumination generated by the anti-counterfeiting key.

24. The code reader according to claim 23, wherein the one or more diffractive gratings are a separate feature from the machine-readable indicia associated with product identification.

* * * * *